(12) United States Patent
Salamone, III

(10) Patent No.: US 12,288,470 B2
(45) Date of Patent: Apr. 29, 2025

(54) REAL TIME SONIC BOOM WARNING SYSTEM

(71) Applicant: BOOM TECHNOLOGY, INC., Englewood, CO (US)

(72) Inventor: Joseph Anthony Salamone, III, Centennial, CO (US)

(73) Assignee: Boom Technology, Inc., Centennial, CO (US)

( * ) Notice: Subject to any disclaimer, the term of this patent is extended or adjusted under 35 U.S.C. 154(b) by 388 days.

(21) Appl. No.: 17/330,322

(22) Filed: May 25, 2021

(65) Prior Publication Data

US 2022/0165164 A1    May 26, 2022

Related U.S. Application Data

(60) Provisional application No. 63/117,582, filed on Nov. 24, 2020.

(51) Int. Cl.
G08G 5/00 (2006.01)
B64C 30/00 (2006.01)

(52) U.S. Cl.
CPC ........... G08G 5/0021 (2013.01); B64C 30/00 (2013.01); G08G 5/006 (2013.01); G08G 5/0091 (2013.01)

(58) Field of Classification Search
CPC .... G08G 5/0021; G08G 5/006; G08G 5/0091; G08G 5/0052; B64C 30/00
See application file for complete search history.

(56) References Cited

U.S. PATENT DOCUMENTS

| | | | |
|---|---|---|---|
| 3,655,147 A | 4/1972 | Preuss | |
| 4,094,479 A | 6/1978 | Kennedy, Jr. | |
| 4,283,924 A | 8/1981 | Schiitze | |
| 5,913,917 A | 6/1999 | Murphy | |
| 6,266,610 B1 | 7/2001 | Schultz et al. | |
| 7,530,266 B2 * | 5/2009 | Tillotson | G01N 29/0672 73/170.16 |
| 7,599,805 B2 * | 10/2009 | Pilon | G01H 17/00 702/56 |
| 7,770,377 B2 | 8/2010 | Rolt | |
| 8,145,366 B1 * | 3/2012 | Haering, Jr. | G01C 23/00 244/1 N |

(Continued)

FOREIGN PATENT DOCUMENTS

| | | |
|---|---|---|
| DE | 3014323 | 1/1982 |
| EP | 0732263 | 9/1996 |

(Continued)

OTHER PUBLICATIONS

Berton et al., "Supersonic Technology Concept Aeroplanes for Environmental Studies," AAIA SciTech Forum and Exposition, Orlando, Florida Jan. 6-10, 2020, 19 pages.

(Continued)

*Primary Examiner* — Aniss Chad
*Assistant Examiner* — Christopher George Fees
(74) *Attorney, Agent, or Firm* — Perkins Coie LLP

(57) ABSTRACT

Commercial supersonic aircraft and associated system and methods. A representative real time sonic boom warning system can detect when the trajectory of the commercial supersonic aircraft is likely to cause sonic booms that disturb designated areas (e.g., over land or population centers) and notify the operator accordingly.

20 Claims, 14 Drawing Sheets

(56) References Cited

U.S. PATENT DOCUMENTS

| | | | |
|---|---|---|---|
| 8,579,375 B2 | 11/2013 | Marais et al. | |
| 8,887,485 B2 | 11/2014 | Ress | |
| 9,446,839 B2* | 9/2016 | Freund | B64C 30/00 |
| 9,536,435 B1* | 1/2017 | Shay | G08G 5/0043 |
| 9,849,999 B1 | 12/2017 | Fymat | |
| 10,209,122 B1* | 2/2019 | Suddreth | G08G 5/0017 |
| 10,710,740 B1* | 7/2020 | Tchon | G01C 23/00 |
| 10,793,266 B2 | 10/2020 | Scholl et al. | |
| 10,810,886 B2 | 10/2020 | Suddreth et al. | |
| 11,238,745 B2* | 2/2022 | Villa | G08G 5/0026 |
| 11,492,134 B2* | 11/2022 | Rallabhandi | G06F 30/20 |
| 11,715,381 B1* | 8/2023 | Haering, Jr. | G01S 5/28 |
| | | | 342/350 |
| 2002/0011071 A1 | 1/2002 | Needham | |
| 2005/0098681 A1* | 5/2005 | Berson | G08G 5/0052 |
| | | | 244/1 N |
| 2008/0228413 A1* | 9/2008 | Pilon | G01H 17/00 |
| | | | 702/56 |
| 2009/0112535 A1 | 4/2009 | Phillips | |
| 2010/0036606 A1 | 2/2010 | Jones | |
| 2013/0226443 A1 | 8/2013 | Scofield et al. | |
| 2013/0261914 A1 | 10/2013 | Ingram et al. | |
| 2013/0341459 A1 | 12/2013 | Kosheleff | |
| 2014/0081569 A1 | 3/2014 | Agrawal et al. | |
| 2015/0232204 A1 | 8/2015 | Alexander | |
| 2015/0268048 A1 | 9/2015 | Seastrand | |
| 2017/0132356 A1* | 5/2017 | Shen | B64C 30/00 |
| 2019/0164436 A1* | 5/2019 | Suddreth | G01C 23/00 |
| 2020/0180780 A1* | 6/2020 | Rallabhandi | G06F 30/20 |
| 2021/0139142 A1 | 5/2021 | Scholl et al. | |
| 2021/0233413 A1* | 7/2021 | Holloway | G08G 5/0052 |
| 2021/0339876 A1* | 11/2021 | Melendez | B64C 13/16 |
| 2022/0057214 A1* | 2/2022 | O'Dell | G08G 5/0039 |
| 2022/0223052 A1* | 7/2022 | Holmes | G08G 5/0026 |

FOREIGN PATENT DOCUMENTS

| | | |
|---|---|---|
| RU | 31561 | 8/2003 |
| RU | 2442945 | 2/2012 |
| RU | 196109 | 2/2020 |
| WO | WO-2006086124 | 8/2006 |
| WO | WO-2014176622 | 11/2014 |
| WO | WO-2015175077 | 11/2015 |

OTHER PUBLICATIONS

Thesis, MSc., "Design and Noise Acceptability of Future Supersonic Transport Aircraft," Delft University of Technology, Dec. 2020, 136 pages.

Liebhardt, Bernd, "Sonic Boom Carpet Computation as a Basis for Supersonic Flight Routing," American Institute of Aeronautics and Astronautics, AIAA 2019-3387, Jun. 2019, 13 pages.

International Search Report and Written Opinion for International Patent Application No. PCT/US2021/059358, Applicant: Boom Technology, Inc., mailed Feb. 3, 2022, 7 pages.

U.S. Appl. No. 17/980,238, filed Nov. 3, 2022, Hunter et al.

\* cited by examiner

REAL TIME SONIC BOOM WARNING SYSTEM

CROSS-REFERENCE TO RELATED APPLICATION

The present application claims priority to U.S. Provisional Application 63/117,582, filed Nov. 24, 2020, and incorporated herein by reference.

TECHNICAL FIELD

The present technology is directed generally to commercial supersonic aircraft, and associated systems and methods.

BACKGROUND

Supersonic aircraft have been used primarily for military missions since the mid-1900s. Then, in the 1970s, the United States and Europe each developed commercial supersonic aircraft: the supersonic transport, or "SST" in the United States, and the Concorde in Europe. The Concorde went on to fly commercial passengers on transatlantic routes through the 1990s. However, in light of the Concorde's retirement in 2003, there remains a need in the industry for a viable and profitable commercial supersonic aircraft.

One challenge to the viability of commercial supersonic aircraft is the impact of sonic booms. When an aircraft travels at supersonic speeds it creates shock waves, which are associated with a sound known as a sonic boom. Sonic booms from present-day aircraft can be loud and startling. As a result, aviation authorities typically prohibit commercial supersonic aircraft from operating in a manner that generates sonic booms over regulated regions (e.g., over landmasses or populated areas). It would therefore be advantageous to enable commercial supersonic aircraft operators to avoid generating sonic booms in those prohibited regions.

Figure 1:
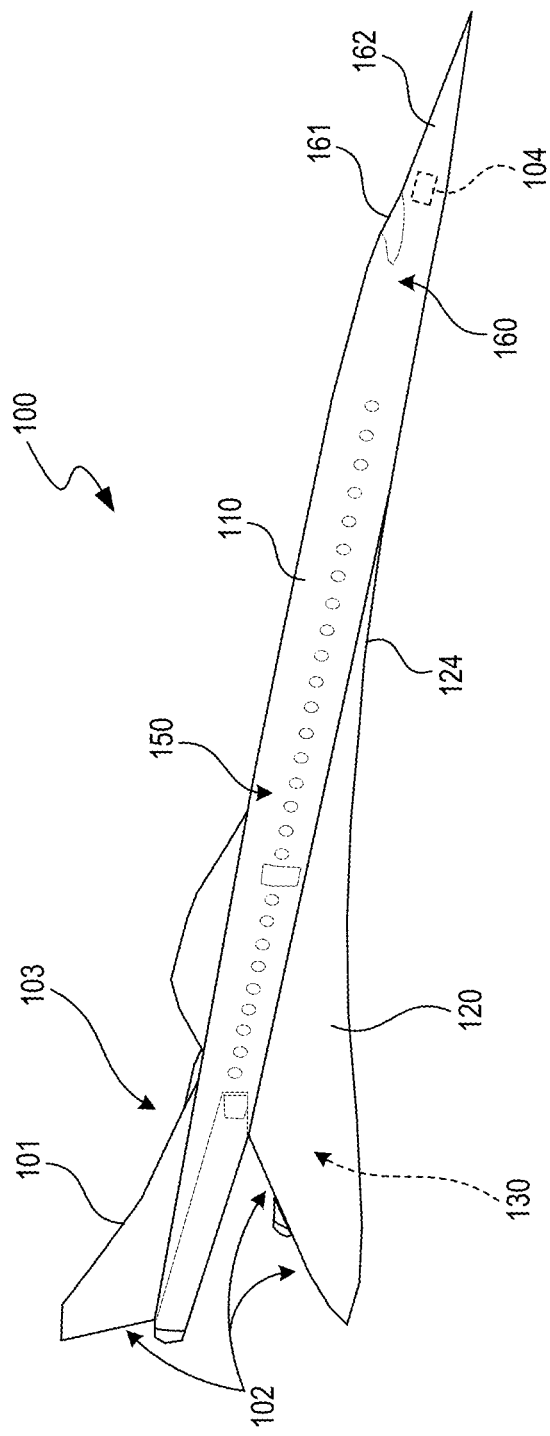
FIG. 1 is a partially schematic, isometric illustration of a commercial supersonic aircraft in which a real time sonic boom warning system can operate.

In the present disclosure, the drawings have not necessarily been drawn to scale. Similarly, some components and/or operations can be separated into different blocks or combined into a single block for the purpose of discussion of some of the implementations of the present technology. Moreover, while the technology is amenable to various modifications and alternative forms, specific implementations have been shown by way of example in the drawings and are described in greater detail below. The intention, however, is not to limit the technology to the particular implementations described. On the contrary, the technology is intended to cover all suitable modifications, equivalents, and alternatives.

DETAILED DESCRIPTION

Systems that determine, in real time, when a supersonic aircraft is likely to generate a sonic boom that encroaches on a regulated region, and warns a pilot or other operator of the supersonic aircraft accordingly (a "real time sonic boom warning system"), are described within. During operation of the supersonic aircraft, the real time sonic boom warning system evaluates data related to the aircraft's flight and environmental conditions, which are predictive of the prevalence and reach of sonic booms generated by the aircraft. Data evaluated by the real time sonic boom warning system can include land and sea surface geospatial data, meteorological data, and aircraft trajectory data (e.g., a current position, a heading, and speed). The data can be obtained from various sources, including sensors onboard the aircraft, a ground-based controller associated with operation of the aircraft, and/or one or more third parties.

The real time sonic boom warning system evaluates the data (e.g., surface geospatial data, meteorological data, and trajectory data) to predict, e.g., in real time, the areas on the surface where the sonic boom generated by the aircraft will be heard (i.e., the boom carpet). As described herein, the real time sonic boom warning system can predict the boom carpet associated with a primary boom, as well as the boom carpet associated with secondary or over-the-top booms. The system can provide information regarding the predicted boom carpets to the aircraft pilot or other operator, for example by indicating the location of the boom carpets on a cockpit display.

During operation of the supersonic aircraft, the real time sonic boom warning system evaluates whether any boom carpets will encroach on a prohibited region. For example, aviation authorities and/or other regulatory agencies may prohibit commercial supersonic aircraft from generating sonic booms over landmasses and/or populated areas, as well as supersonic operations within a coastal buffer zone. The real time sonic boom warning system can additionally determine a standoff distance for these prohibited regions, which provides a margin of offset from the region boundaries that accounts for the forward and/or lateral throw of predicted sonic booms.

The standoff distance used by the real time sonic boom warning system can be fixed, or the real time sonic boom warning system can calculate a standoff distance that varies with different conditions. For example, the standoff distance can vary based on atmospheric conditions, the aircraft flight conditions, and/or the aircraft's heading relative to nearby landmasses. Typical values for standoff distances can range from 100 to 200 nautical miles. As described herein, the real time sonic boom warning system can determine a standoff distance that reflects the closest distance relative to nearby landmasses the aircraft can travel based on the predicted sonic boom carpet and the associated aircraft trajectory. The sonic boom carpet's forward throw is often a different distance than its lateral extent. The standoff distance can be adjusted based on orientation of the projected flight path and the nearby landmasses. Thus, considerations for the standoff distance include the entire swath of the predicted sonic boom carpet that intercepts the surface. In embodiments in which the nearby landmasses are a coastline, the standoff distance can alternatively be referred to as coastal buffer distance. That is, the coastal buffer distance characterizes how close the aircraft may be to the coast.

If the real time sonic boom warning system determines that a predicted boom carpet will encroach on prohibited regions, or that the aircraft's projected location will violate a standoff distance, the system will warn the aircraft pilot or other operator that the aircraft's sonic boom is predicted to encroach on regions it should avoid (e.g., landmasses or populated areas). For example, the system can indicate on a cockpit display where a sonic boom is predicted to encroach on a prohibited region. As a further example, the system can indicate on a cockpit display where on the aircraft's flight path the aircraft is predicted to violate sonic boom prohibitions. Using the warning information from the real time sonic boom warning system, which indicates to a pilot which areas the aircraft should avoid, the pilot can adjust the aircraft's trajectory (e.g., change heading, altitude, or speed) to prevent the aircraft from generating sonic booms in regions where sonic booms are prohibited.

Various implementations of the system will now be described. The following description provides specific details for a thorough understanding and an enabling description of these implementations. One skilled in the art will understand, however, that the system can be practiced without many of these details and/or with alternative approaches. Additionally, some well-known structures or functions may not be shown or described in detail so as to avoid unnecessarily obscuring the relevant description of the various implementations. The terminology used in the description presented below is intended to be interpreted in its broadest reasonable manner, even though it is being used in conjunction with a detailed description of certain specific implementations of the system.

Suitable Environments

FIG. 1 and the following discussion provide a brief, general description of a suitable environment in which a real time sonic boom warning system can be implemented. Although not required, aspects of the system are described in the general context of computer-executable instructions, such as routines executed by a general-purpose computer, a personal computer, a server, and/or other computing system. The system can also be embodied in a special purpose computer or data processor that is specifically programmed, configured, and/or constructed to perform one or more of the computer-executable instructions explained in detail herein. Indeed, the terms "computer" and "computing device," as used generally herein, refer to devices that have a processor and non-transitory memory, like any of the above devices, as well as any data processor or any device capable of communicating with a network. Data processors include programmable general-purpose or special-purpose microprocessors, programmable controllers, application-specific integrated circuits (ASICs), programmable logic devices (PLDs), field-programmable gate arrays (FPGAs), or the like, and/or any suitable combination of such devices. Computer-executable instructions may be stored in memory, such as random-access memory (RAM), read-only memory (ROM), flash memory, or the like, and/or any suitable combination of such components. Computer-executable instructions may also be stored in one or more storage devices, such as magnetic or optical-based disks, flash memory devices, and/or any other suitable type of non-volatile storage medium or non-transitory medium for data. Computer-executable instructions may include one or more program modules, which can include routines, programs, objects, components, data structures, and so on, that perform particular tasks and/or implement particular abstract data types. Information handled by these computing systems can be presented through any suitable display medium, including a CRT display or LCD.

Aspects of the real time sonic boom warning system can also be practiced in distributed computing environments, where tasks or modules are performed by remote processing devices, which are linked through a communications network such as a local area network (LAN), wide area network (WAN), or the Internet. In a distributed computing environment, program modules or subroutines may be located in both local and remote memory storage devices. Aspects of the system described herein may be stored or distributed on tangible, non-transitory computer-readable media, including magnetic and optically readable and removable computer discs, stored in firmware in chips (e.g., EEPROM chips). Alternatively, aspects of the system may be distributed electronically over the Internet or over other networks (including wireless networks). That is, aspects of the real time sonic boom warning system can be executed by computing systems within a commercial supersonic aircraft, by computing systems located on the ground (e.g., at a ground-based controller), or in combinations of the two (e.g., aircraft-based and ground-based computing systems, in communication with each other, implementing aspects of the real time sonic boom warning system). Those skilled in the relevant art will recognize that portions of the system may reside on a server computer, while corresponding portions reside on a client computer. Data structures and transmission of data particular to aspects of the system are also encompassed within the scope of the system.

FIG. 1 is a partially schematic, isometric illustration of a commercial supersonic aircraft 100 configured in accordance with an embodiment of the present technology. The aircraft 100 includes a fuselage 110, which houses a passenger cabin 150 and a flight deck 160. In a particular embodiment, the cabin 150 can be configured to carry about 65 revenue-generating passengers. More generally, the cabin 150 can have a maximum capacity from 50 to 75 passengers.

The foregoing range refers to upright passenger seats. In other embodiments, the cabin 150 can include lay-flat seats and/or upright seats. For example, the cabin 150 can include 20 lay-flat seats in an all-business class, low density configuration. In other embodiments, the cabin 150 can include a mix of lay-flat seats (e.g., less than 20) and upright seats. This capacity is distinguished from a non-commercial supersonic aircraft (e.g., a military or training aircraft), and is roughly equivalent to the business class capacity of a typical transoceanic, subsonic commercial aircraft. The convenience of reduced travel time provided by the aircraft 100 is expected to more than offset the likely reduction in space available to each passenger within the cabin 150, when compared with business class seats. Accordingly, for at least this reason, it is expected that embodiments of the aircraft 100 can be profitable to operate by carrying passengers paying a ticket price competitive with that of a subsonic business class passenger seat.

The aircraft 100 can include a supersonic wing 120, for example, a highly swept delta-wing configuration to provide suitable lift at supersonic cruise conditions, as well as at subsonic takeoff and landing conditions. In a particular embodiment, the wing 120 has a shape that is the same as or generally similar to existing NACA airfoils. A vertical stabilizer 101 (e.g., carried by an empennage 103 of the aircraft 100), as well as suitable flight control surfaces 102 carried by the wing 120 and/or the vertical stabilizer 101, provide for aircraft stability and control. The aircraft 100 can further include a chine 124 that extends forward of the main portion of the wing 120, along the fuselage 110.

Aspects of a control system 104 operate automatically, autonomously, and/or under the direct control of pilots seated at the flight deck 160, which is positioned toward the nose 162 of the aircraft 100. The nose 162 has a sharp configuration, suitable for efficient cruise operation at supersonic speeds. A corresponding flight deck windshield 161 can be highly integrated into the sharp, conical contour of the nose 162. The flight deck 160 may be outfitted with synthetic vision systems to provide additional visibility to the pilots, particularly during takeoff, climb-out, and landing, when the angle of attack of the aircraft 100 may be sufficiently high to prevent or impede the pilots' normal visual access in the forward direction. Suitable synthetic vision systems can present camera-based images that, in particular embodiments, are software-enhanced.

The aircraft 100 includes a propulsion system 130 configured to power the aircraft efficiently at supersonic speeds (e.g., in a range from Mach 1.6 to Mach 2.4, and in some embodiments, Mach 2.2) during cruise, while also providing reasonably efficient subsonic performance during takeoff, climb-out, subsonic cruise, descent, and landing. In a particular embodiment, the propulsion system 130 includes two wing-mounted nacelles, each of which supplies air to and supports a corresponding wing-mounted engine. Additional embodiments of aircraft 100 may include configurations with four engines.

In a particular embodiment, the flight deck 160 shown in FIG. 1 can include a synthetic vision system to provide the pilots with sufficient visual awareness of the environment outside the aircraft, despite the pointed, high aspect ratio configuration of the aircraft nose 162 and windshield 161 (see FIG. 1). In a particular embodiment, the synthetic vision can be provided by multiple cameras positioned at different points of the aircraft 100 to obtain different views of the external environment. The information obtained from the cameras can be provided to the pilot on multiple screens positioned at the flight deck and/or via a virtual reality display, and/or via other suitable techniques. In any of these embodiments, the synthetic vision presented to the pilots can serve as the primary vision for the environment external to the aircraft for (a) all flight segments, or (b) selected flight segments (e.g., high angle of attack maneuvers, including climb-out and/or approaching landing). This is unlike typical synthetic vision systems, which generally provide a backup capability to the pilots' view of the environment through the flight deck windshield. An advantage of the synthetic vision system operating as the primary vision system is that it can provide the pilots with sufficient visual access to the outside, without requiring an articulating nose and/or other complex and/or heavy mechanisms that have been used on conventional supersonic aircraft, for example, the Concorde. In some embodiments, the windshield can be eliminated entirely. In particular embodiments, the aircraft 100 can include multiple backup cameras and/or other redundancy arrangements in case of one or more system failures. The cameras can operate within the visible spectrum and/or can operate outside the visible spectrum. The system can include onboard, real-time processing that generates a false-color (or other rendered) image for improved forward visibility. One representative arrangement includes a pilot procedure in which the aircraft (a) flies the final approach at a high crab angle (allowing the pilot visual access through a side window) followed by (b) straightening the aircraft out just before touchdown.

Figure 2:
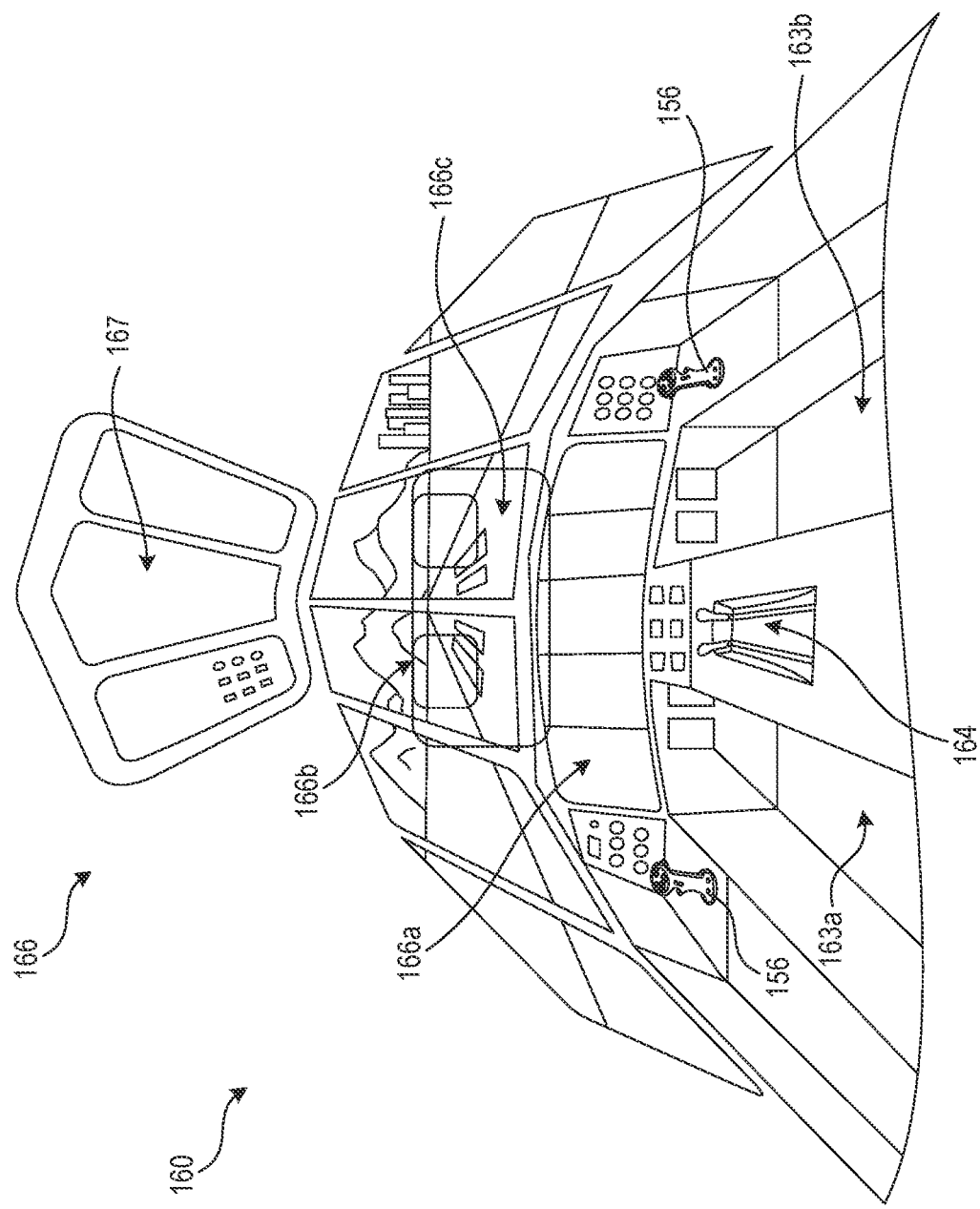
FIG. 2 is a partially schematic, isometric illustration of a supersonic aircraft flight deck in which the real time sonic boom warning system can operate.

FIG. 2 is a partially schematic, isometric illustration of a representative flight deck 160 configured in accordance with an embodiment of the present technology. The flight deck includes crew seats 163, including a pilot seat 163a and a first officer seat 163b. The pilot and first officer each have access to a corresponding side stick 156 to control the aircraft flight direction. The side stick 156 can operate as a joystick during flight, can be twisted for steering on the ground, and can be connected both digitally and mechanically so that if one side stick 156 is moved, the other moves correspondingly. The flight deck 160 can further include a digital throttle and inlet control 164, e.g., with a single lever per engine. An overhead panel 167 can include additional control input and output elements. The flight deck 160 is further outfitted with one or more displays 166, for example, five large flat panel touch displays 166a positioned beneath a heads-up display 166b, which can support a pop-up display 166c. In a particular embodiment, the pop-up display 166c presents a synthetic vision image via inputs from the cameras describe above, and in a particular embodiment, the image presented to the flight deck crew can be augmented with augmented reality glasses. In some embodiments of the real time sonic boom warning system, the system can present sonic boom warning information on one or more of the displays 166. For example, the system can display a map presenting the aircraft's trajectory and projected flight path line, as well as indications of landmasses, population centers, coastal buffer zones, etc. Additionally, on the map the system can display indications of predicted sonic booms, predicted boom carpets, and warnings associated with sonic booms. Accordingly, as discussed above, the flight crew can receive a full complement of visual cues for flying the aircraft during any phase of its operation, despite limited direct visual access to the external environment.

Figure 3:
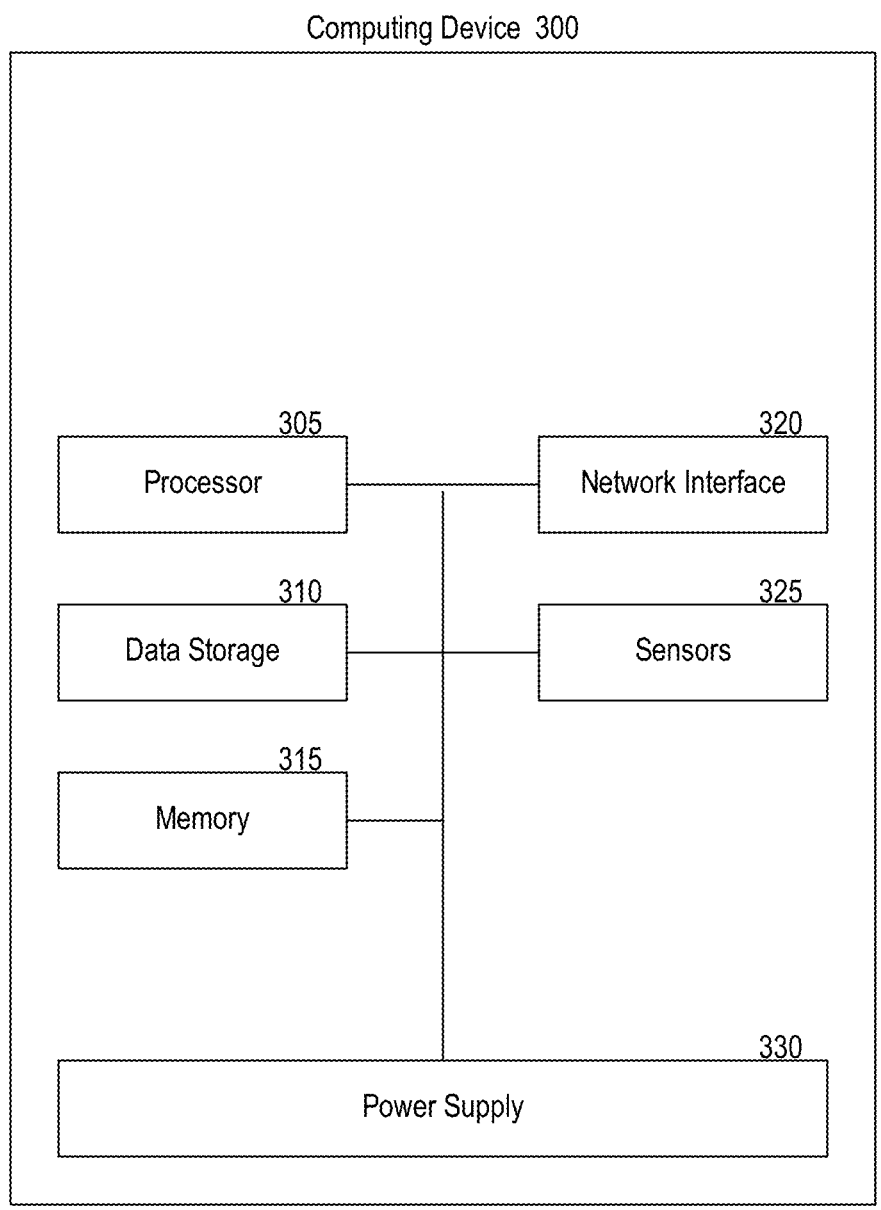
FIG. 3 is a block diagram of a representative computing device in which the real time sonic boom warning system can operate.

FIG. 3 is a block diagram of a representative computing device 300 on which aspects of the real time sonic boom warning system can be implemented. The computing device 300 can be part of a commercial supersonic aircraft's onboard computing system, can be located at a ground-based flight controller, can be part of a cloud computing platform or cluster, and/or can be located in a data center or other suitable location. The computing device 300 typically includes a processor 305 for executing processing instructions, a data storage medium component 310 (e.g., hard drive, flash memory, memory card, etc.), volatile memory and/or non-volatile memory 315, network interface 320, sensors 325 (e.g., pressure sensors, speed sensors, altimeters, compasses, gyroscopes, atmospheric sensors, and miscellaneous laser-based systems), and power supply 330. The various components of the computing device 300 can be interconnected via a bus.

The data storage medium component 310, and volatile and non-volatile memory 315, generally store information such as processor-readable instructions, data structures, program modules, or other data. Some examples of information that may be stored include basic input/output systems (BIOS), operating systems, and applications. For example, they can store land and sea surface geospatial data, data on an aircraft's current or planned flight trajectory, atmospheric data, meteorological data, climate forecast models, and the like. The stored information can also include routines for predicting sonic boom characteristics (e.g., locations at which the sonic booms will contact the earth's surface) and warning a pilot accordingly.

The real time sonic boom warning system can utilize sensors 325 to survey the atmosphere above the aircraft, and to obtain meteorological information in real time for sonic boom warning calculations. As a further example, sensors 325 can collect temperature and wind data as a function of geometric or geopotential altitude. As described herein, the real time sonic boom warning system can use the upper air data, obtained from sensors 325, as an input for computing secondary sonic boom locations that feed into the warning system process.

Sonic Boom Warning System

Figure 4:
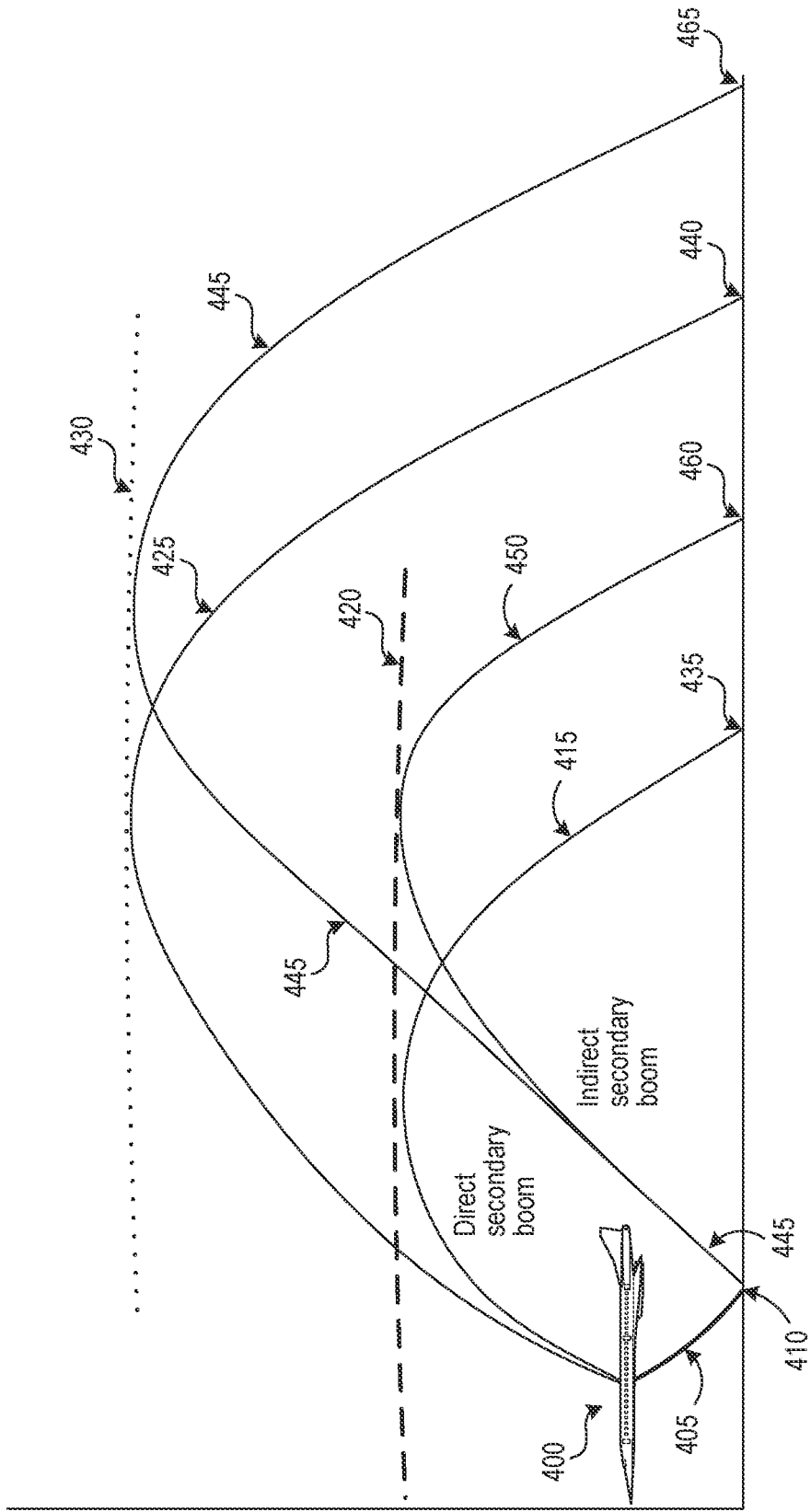
FIG. 4 illustrates a representative commercial supersonic aircraft that is in flight and generating sonic booms.

FIG. 4 illustrates a representative commercial supersonic aircraft 400 that is in flight and generating sonic booms. At supersonic speeds, the aircraft 400 generates a primary boom 405, which is associated with a shockwave that emanates from the aircraft and directly strikes the earth's surface (whether land or water). The primary boom 405 generates a primary boom carpet 410, which is the area on the surface in which the primary boom can be heard. In accordance with representative embodiments of the present technology, the real time sonic boom warning system predicts where on the surface the primary boom carpet 410 will strike during flight, evaluates whether the primary boom carpet will encroach on prohibited regions (e.g., over land, over a population center, and/or within a certain distance of the coast), and warns a pilot of the aircraft 400 accordingly.

The aircraft 400 can also generate one or more secondary booms, or over-the-top booms, associated with shockwaves that strike the earth's surface after refracting in the upper atmosphere. Different types of secondary booms can occur, which are characterized by the path of the boom strike to the surface. For example, a direct secondary boom initially emanates upward from above the aircraft, and is refracted at some altitude above the aircraft and down toward the surface. As a further example, an indirect secondary boom initially emanates downward below the aircraft and hits the ground (i.e., as part of a primary boom carpet), but is reflected up from the ground and eventually refracts at the upper atmosphere back down toward the ground. That is, a sonic boom ray can contribute to both a primary boom carpet as well as an indirect secondary sonic boom. Additionally, different secondary booms can be caused by shockwaves refracting at different layers of the atmosphere. For example, depending on atmospheric conditions, aircraft trajectory, and the particular azimuth with which a sonic boom ray is launched, a refraction can occur at the stratosphere and/or thermosphere. As illustrated in FIG. 4, for example, a first direct secondary boom 415 can be caused by a shockwave refracting at the stratosphere 420, and a second direct secondary boom 425 can be caused by a shockwave refracting at the thermosphere 430, each of which generate their own secondary boom carpets 435 and 440. FIG. 4 additionally illustrates the primary boom carpet 410 reflecting 445 off of the surface and propagating back into the upper atmosphere, and refracting off of the stratosphere 420 (resulting in first indirect secondary boom 450) and at the thermosphere 430. In accordance with representative embodiments of the present technology, the real time sonic boom warning system predicts where on the surface the primary boom carpet 410 and secondary boom carpets 435, 440, 460, and 465 will strike during flight, evaluates whether the sonic boom carpets will encroach on prohibited regions, and warns a pilot of the aircraft 400 accordingly. In some embodiments, the real time sonic boom warning system will not predict the surface strike of secondary boom carpets corresponding to refractions off of certain atmospheric layers (e.g., secondary boom carpets 440 and 465, corresponding to refractions at the thermosphere 430). In some embodiments, the real time sonic boom warning system will warn the pilot of secondary booms corresponding to refractions off of some atmospheric layers (e.g., the first direct secondary boom 415 caused by refracting off of the stratosphere 420), but will not warn the pilot of secondary booms corresponding to refractions off of other atmospheric layers (e.g., the second direct secondary boom 425 caused by refracting at the thermosphere 430). That is, for example, in some embodiments, the real time sonic boom warning system can ignore thermospheric refraction of secondary booms since they are highly unlikely to create any perceptible disturbance at the surface.

The real time sonic boom warning system can, in some embodiments, differentiate between the secondary booms that refract from the stratosphere and the thermosphere (whether direct or indirect secondary booms) by evaluating the altitude at which the refraction points occur. For example, the real time sonic boom warning system can classify secondary booms with a refraction point altitude of approximately 4-12 miles as being associated with a stratospheric refraction, and can classify secondary booms with a refraction point altitude of approximately 50 to 300+ miles as being associated with a thermospheric refraction. In some embodiments, the real time sonic boom warning system determines the refraction point altitude based on the point at which the slope of a sonic boom ray transitions from a positive slope to a negative slope. That is, the refraction point altitude can occur where the real time sonic boom warning system detects that a ray path transitions from traveling upward to traveling downward. In some embodiments of the real time sonic boom warning system, the system does not track rays if the rays' refraction occurs above the stratosphere or if the system does not detect a refraction.

Although FIG. 4 illustrates secondary booms caused by refractions at two atmospheric layers (the stratosphere and the thermosphere), it will be appreciated that the system can predict secondary booms, and associated boom carpets, corresponding to refractions from other atmospheric layers (e.g., troposphere, mesosphere, etc.).

The real time sonic boom warning system can also, in some embodiments, distinguish between direct and indirect secondary sonic boom types. As described above, a direct secondary boom is where the sonic boom initially emanates from above the aircraft and then is refracted at an altitude above the aircraft. In contrast, an indirect secondary sonic boom is the result of a reflected primary sonic boom at the ground, which after reflection, will propagate up to an altitude above the aircraft where refraction will redirect the sonic boom back to the ground.

Figure 5:
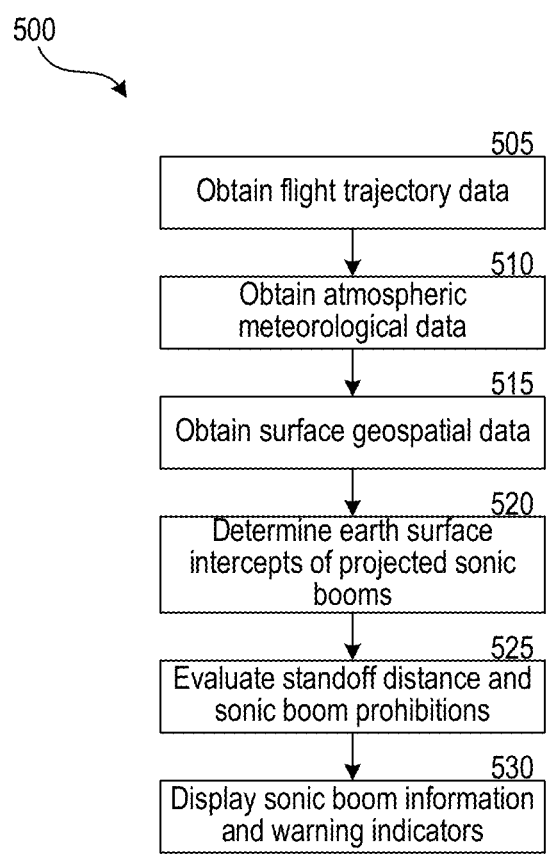
FIG. 5 is a flowchart of a process implemented by a real time sonic boom warning system for generating sonic boom warnings, in accordance with representative embodiments of the present technology.

FIG. 5 is a flowchart of a process 500, implemented by the real time sonic boom warning system, for notifying (e.g., warning) supersonic aircraft operators (pilots and/or other operational personnel) of sonic booms that are predicted to impact prohibited regions.

The process 500 begins at block 505, where the system obtains flight trajectory data for a supersonic aircraft. The trajectory data can include the aircraft's current position, heading, altitude, airspeed (e.g., Mach number), and other positional information. The flight trajectory data can also include the aircraft's projected location over time, or flight path, based on the aircraft's current positional information and a prepared flight plan. The flight trajectory data can, for example, be maintained in a data storage area onboard the aircraft or can be retrieved from a ground-based flight controller in advance of flight or when the aircraft is in flight. The flight trajectory data can also update while the aircraft is in flight (that is, current positional information can be updated, the aircraft's flight path can change based on pilot maneuvers, etc.).

At block 510, the system obtains atmospheric meteorological data. The meteorological data can include wind, temperature, air density, and other information characterizing conditions in the atmosphere, including the stratosphere, thermosphere, and other upper layers of the atmosphere. The meteorological data can also include statistical semi-empirical models describing atmospheric behaviors in the upper layers of the atmosphere. The meteorological data can also include radiosonde balloon data and climate forecast models. The meteorological data can be obtained from third parties, including NASA's Goddard Earth Sciences and the University Corporation for Atmospheric Research (UCAR). The real time sonic boom warning system can use aspects of the meteorological data, alone or in combination, to evaluate characteristics of the upper atmosphere. For example, in some embodiments, the real time sonic boom warning system can use the climate forecast models and the NASA data to characterize the upper atmosphere for the secondary booms refracted at the thermosphere and stratosphere, respectively.

At block 515, the system obtains surface geospatial data. The geospatial data can include, for example, coordinate information on oceans, coastlines, landmasses, and population centers along the aircraft's path. The geospatial data can also include information on surface regions in which sonic booms are permitted or prohibited. The geospatial data can also include data on specific coastal buffer distances that have been mandated by certain regions.

At block 520, the system generates data characterizing sonic booms predicted to project from the aircraft, and determines where the sonic boom projections are likely to strike or intercept the earth's surface. The predicted sonic boom projections and/or earth surface intercepts can be based on the obtained flight trajectory data, atmospheric meteorological data, and/or surface geospatial data. That is, for example, the system can predict sonic boom projections emanating from the aircraft at various points along the aircraft's flight trajectory. As a further example, aspects of the sonic boom projection can be based on the meteorological data, such as whether and how a sonic boom refracts. As still a further example, the determination of where the sonic booms intercept the earth can be based on the surface geospatial data. In some embodiments, the determined earth surface intercepts can characterize primary boom carpets for a primary sonic boom and/or secondary boom carpets for a secondary sonic boom. In some embodiments the system predicts sonic booms based on computer-modeling of sonic boom rays that are predicted or expected to emanate from the aircraft (hereinafter, "projected sonic boom rays"). In some embodiments the system predicts sonic booms based on projected sonic boom rays that are generated (e.g., emanate from the aircraft) at a common instance in time; in such embodiments the system can generate isopemps where the projected sonic booms strike the surface. In some embodiments the system predicts sonic booms based on projected sonic boom rays with a common earth surface intercept time (e.g., that strike the surface at a common instance in time); in such embodiments the system can generate isolabes where the projected sonic booms strike the surface. In some embodiments the system determines a common earth surface intercept time of multiple projected sonic boom rays, to construct a sonic boom wavefront, using a time synchronization. Further details on determining earth surface intercepts using time synchronization to identify projected sonic boom rays with a common earth surface intercept time, in accordance with representative embodiments of the present technology, are provided below in reference to FIG. 6.

At block 525, the system evaluates whether any of the predicted sonic boom strike locations violate any prohibitions against sonic booms. In some embodiments, the system evaluates whether any of the sonic boom strike locations will strike a landmass, or whether any of the sonic boom strike locations will strike a populated area. In some embodiments, to determine whether any sonic boom strikes will violate prohibited regions, the system calculates a standoff distance. The standoff distance indicates a threshold distance from the prohibited regions, which can account for the forward throw and/or lateral throw of a sonic boom. The system can calculate the standoff distance, for example, based on the aircraft's flight trajectory, the surface-level geospatial data, the available meteorological information, and the sonic boom surface intercept locations. In embodiments in which it calculates a standoff distance, the system can evaluate whether the aircraft's flight path indicates that the aircraft is projected to violate the standoff distance in the future. The standoff distance can also account for the trajectory of the aircraft and meteorological conditions. Further details on calculating a standoff distance, in accordance with representative embodiments of the present technology, are provided below in reference to FIG. 8.

At block 530, the system provides sonic boom information to a user, such as a pilot or ground-based flight controller. For example, the system can visually display a map updated in real time, with information indicating prohibited regions, the standoff distance from prohibited regions, predicted primary and secondary sonic boom strike locations, and predicted primary and secondary boom carpets. The system can also provide sonic boom warning information. For example, the system can visually highlight on a map any predicted sonic boom strike locations, or predicted boom carpets, that will violate a prohibited region or standoff distance. As a further example, the system can visually indicate on a map where along a flight path the aircraft will cause the violations of any prohibited regions, such that an aircraft pilot or ground-based flight controller will know where the aircraft should avoid. In a still further example, the system can generate auditory warnings or alarms to warn a user via a Cockpit Alert System (CAS) message. In this way, information is provided that enables the pilot to make maneuvers and adjust the aircraft's trajectory and flight path, such that the indicated part of the flight path can be avoided. As the pilot makes maneuvers, and the aircraft's flight path changes, the system can update the information (e.g., the display) accordingly.

Figure 6:
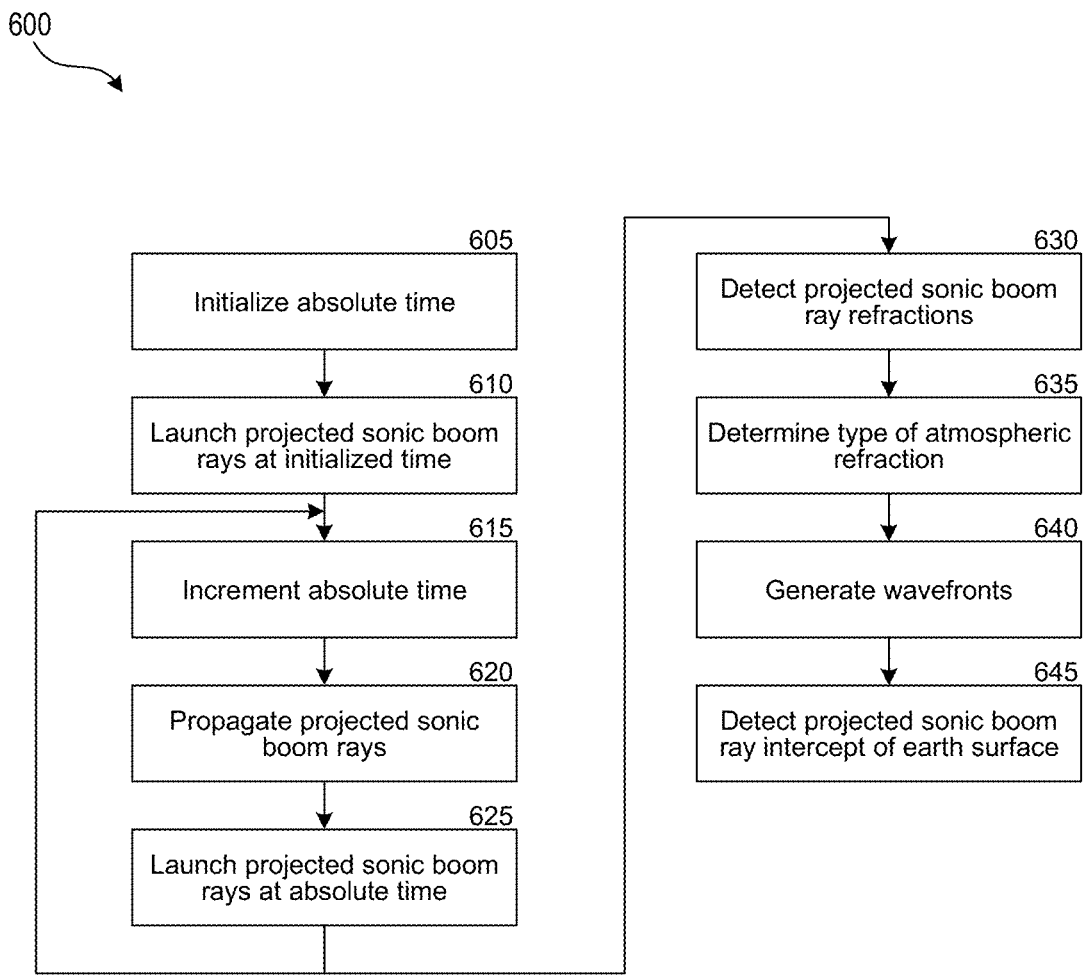
FIG. 6 is a flowchart of a process implemented by a real time sonic boom warning system for determining earth surface intercepts of projected sonic boom rays, in accordance with representative embodiments of the present technology.

FIG. 6 is a flowchart of a process 600, implemented by the real time sonic boom warning system, for determining earth surface intercepts of projected sonic boom rays at a common instance in time. The process 600 can be performed, for example, as part of a process for warning supersonic aircraft pilots and other users of sonic booms (e.g., as represented by block 520 of the process 500 illustrated in FIG. 5). That is, the process 600 can be performed to determine different earth surface intercepts generated along an aircraft's trajectory.

The process 600 begins at block 605, where the system initializes an absolute time. As described herein, the system utilizes the absolute time to provide a common timeframe to track when sonic boom rays are projected from an aircraft, where the sonic boom rays are at a given time as they propagate, when the sonic boom rays strike the surface of the earth, etc. Accordingly, the absolute time can be initialized to any value that facilitates bookkeeping. For example, in some embodiments the system can initialize the absolute time to an arbitrary start (e.g., "0 seconds"). As a further example, in some embodiments the system can initialize the absolute time to a time related to the aircraft's projected trajectory (e.g., the time of day at which the aircraft is expected to hit supersonic speeds). Furthermore, the system associates the absolute time with a point on the aircraft's flight trajectory. For example, in some embodiments the absolute time of "0 seconds" can correspond to the start of the flight plan or where in the flight plan the aircraft approaches supersonic speeds. As described herein, the system evaluates the status of projected sonic boom rays as the absolute time advances.

At block 610, the system launches projected sonic boom rays that are associated with the initialized absolute time. As described herein, the projected sonic boom rays characterize (e.g., in a computer model or other predictive system) sonic boom rays that are predicted to be generated by the aircraft. Generating a projected sonic boom ray associated with the aircraft is alternatively referred to as launching the projected sonic boom ray. That is, the projected sonic boom rays launched at the initialized absolute time characterize the sonic boom rays predicted to emanate from the aircraft, or be emitted from the aircraft, at that time. The projected sonic boom rays can also be associated with a location when launched, based on the absolute time and the aircraft's trajectory data (e.g., obtained in process 500). For example, the projected sonic boom rays when launched can be associated with the location of the aircraft at the absolute time. In some embodiments, the system launches projected sonic boom rays from the underside of the aircraft and/or from the top or upper surface of the aircraft. In some embodiments, the system launches an array of projected sonic boom rays for a series of azimuthal emission angles. In said embodiments, the series of projected sonic boom rays launched at these discrete azimuthal angles can represent a spatial ring or slice in the Mach cone encircling the aircraft at the common absolute time.

At block 615, the system increments the absolute time. As described herein, the system uses the absolute time to facilitate bookkeeping functions for tracking when projected sonic boom rays are launched, where projected sonic boom rays are at a common time, etc. By incrementing the absolute time, the system can begin to evaluate the state of projected sonic boom rays at the next tracked time. Furthermore, the incremented absolute time can be associated with the aircraft's position advanced along its trajectory. For example, if the system increments the absolute time by 5 seconds, the incremented absolute time may be associated with the aircraft's expected position 5 seconds after its expected position at the previous absolute time. In some embodiments, the system can increment the absolute time by any amount within the range of 0.5 seconds to 1 minute. In some embodiments, the system increments the absolute time by an amount that depends on the aircraft proximity to a coastal region. For example, the system can increment the time by 0.5 seconds when the aircraft is near the coast, and increase the time by a greater amount (e.g., greater delta) when the aircraft is further away from the coast. It will be appreciated that by incrementing the absolute time smaller amounts (e.g., 0.5 seconds), the system can launch more projected sonic boom rays corresponding to smaller changes in the aircraft's expected position, but at the expense of requiring more absolute time increments to cover the aircraft's flight trajectory.

At block 620, the system calculates the propagation of the projected sonic boom rays based on the incremented absolute time. That is, the system calculates the propagation of the projected sonic boom rays, from a prior position to a current position, in the time elapsed between the prior absolute time and the new absolute time (e.g., incremented at block 615). Furthermore, the system can calculate the propagation of projected sonic boom rays that have launched in a most recent launch block, as well as previously launched projected sonic boom rays that continue to propagate. The system can also calculate the propagation of projected sonic boom rays that have refracted at an atmospheric layer and/or reflected off of the earth surface, as described further below. In some embodiments, the system calculates the propagation based on the aircraft's flight trajectory data and meteorological data (e.g., obtained in process 500). For example, as described above, projected sonic boom rays when first launched can be associated with the location of the aircraft at the absolute time at which the rays were launched. Furthermore, the system can calculate the propagated path of the projected sonic boom rays based on the meteorological data associated with that location. In some embodiments, the system performs ray tracing using the formulation described in "Acoustics: An Introduction to Its Physical Principles and Applications" by Allan D. Pierce. However other methodologies for ray tracing may be used. Additionally, the system can account for the ellipsoidal shape of the earth since, for secondary booms, the propagation path is far enough away from the aircraft and high enough in altitude where a spherical or flat earth approximation would reduce the accuracy of the secondary sonic boom earth intercept locations. The system can associate the result of the propagation calculation (e.g., the updated position of each projected sonic boom ray) with the current absolute time, such that the system can determine the state (e.g., position) of each projected sonic boom ray at any given absolute time.

At block 625, the system launches new projected sonic boom rays associated with the current absolute time (e.g., incremented at block 615). The system launches the projected sonic boom rays similarly to those launched at block 610, only that they are associated with different absolute times (e.g., a current absolute time compared to the initialized absolute time). Similarly, the projected sonic boom rays launched at block 615 can be associated with the aircraft's position at the current absolute time. For example, the system can launch azimuthal rings of projected sonic boom rays at the successive interval along the aircraft trajectory, associated with the current absolute time. Notably, the time interval between discrete points along the aircraft trajectory for generating new azimuthal rings of projected sonic boom rays can be the same time interval used for the propagation (e.g., at block 620). Thus as each projected sonic boom ray in the azimuthal ring is propagated, the system can ensure a common absolute time between the successive propagation steps generated at previous absolute times with newly generated azimuthal rings of projected sonic boom rays that are launched as the aircraft travels along its trajectory.

After block 625, the process 600 then continues to block 630 where, as described further herein, the process 600 evaluates whether any of the projected sonic boom rays strike the earth's surface. The process 600 additionally, after block 625, returns to block 615, where the process increments the absolute time, propagates existing projected sonic boom rays, and launches new projected sonic boom rays. In other words, blocks 615-625 repeat to continually launch new projected sonic boom rays and propagate previously launched projected sonic boom rays, as the absolute time increments corresponding to the aircraft's change along its flight trajectory. And, as described further herein, block 630 and the subsequent blocks evaluate the projected sonic boom rays launched and propagated by blocks 615-625.

Figure 7A:
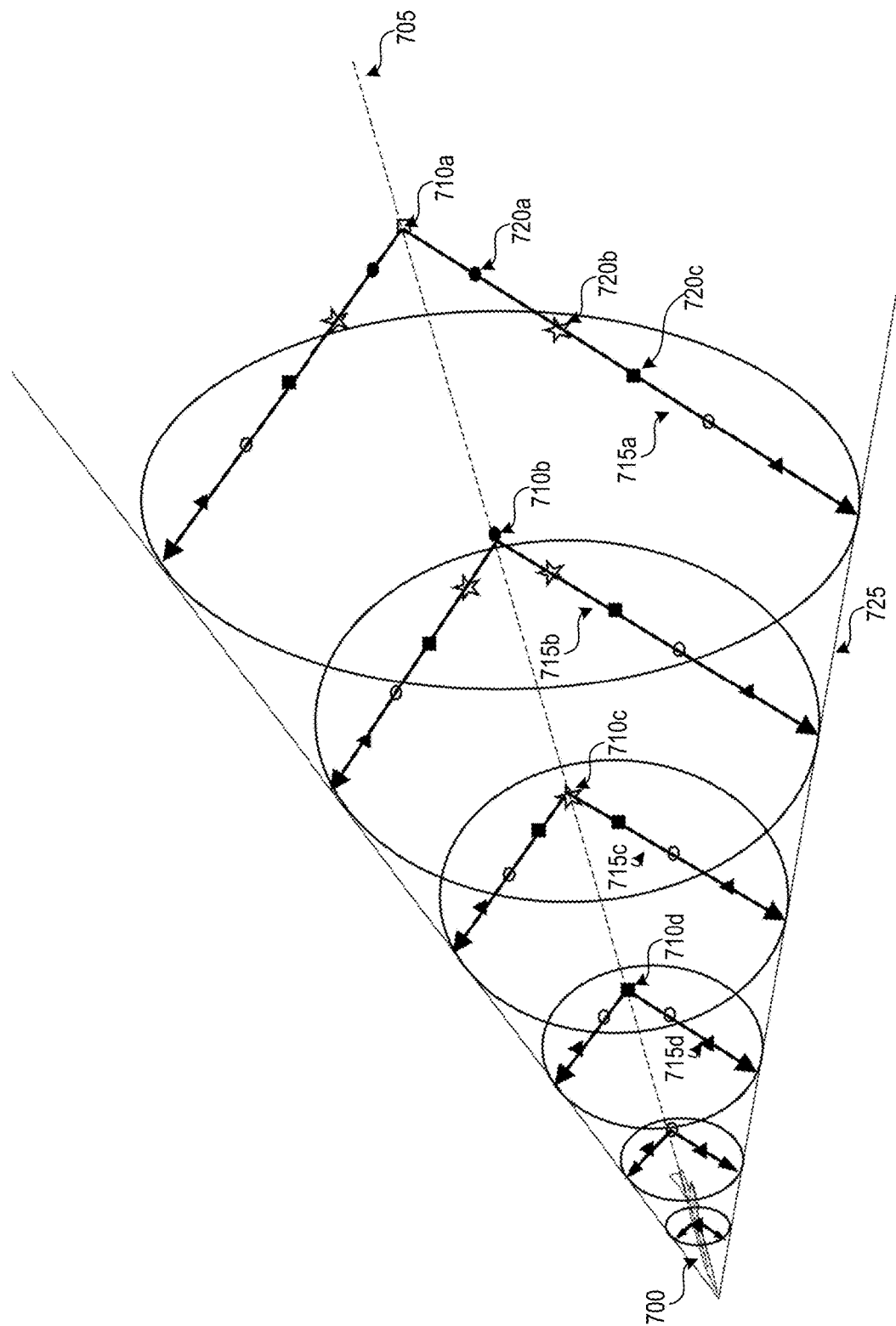
FIG. 7A illustrates a representative commercial supersonic aircraft with projected sonic boom rays, and sonic boom wavefronts calculated based on the projected sonic boom rays, in accordance with representative embodiments of the present technology.

FIG. 7A depicts a representation of the time synchronization of projected sonic boom rays discussed above. Representative commercial supersonic aircraft 700 travels along a trajectory 705, and is located at positions 710a, 710b, 710c, 710d at particular instants of time. For the purpose of illustration, each position is depicted with a different symbol (e.g., position 710a with a hollow square, position 710b with a filled circle, position 710c with a hollow star, and position 710d with a filled square). At each position 710a-710d, sonic boom rays 715a, 715b, 715c, and 715d are predicted to project from the aircraft 700 at the corresponding position. The projected sonic boom rays 715a-715d correspond to each of the azimuths that comprise a ring of the Mach cone. As described above, the system determines the propagation of projected sonic boom rays 715a-715d at different time intervals. For example, as illustrated in FIG. 7A, sonic boom ray 715a is launched from position 710a at an instant of time and propagates to discrete points 720a, 720b, and 720c at successive time intervals. Furthermore, each of the discrete points 720a-720c are depicted with a different symbol, where the same symbol (along either the trajectory 705 or the projected sonic boom rays 715a-715d) represents the same absolute time. As the aircraft 700 travels along its trajectory 705, the wavefront or Mach cone 725 is formed by connecting all of the points that share a common absolute time (e.g., the same symbol). For example, all points depicted by a filled square represent a wavefront, all points depicted by a hollow star represent a wavefront, etc. In other words, the sonic boom wavefront is the outermost surface that connects each of the sonic boom rays from each of the azimuths generated from the successive aircraft 700 positions 710a-710d along the trajectory 705, such as wavefront 725. The wavefront will continue to extended around and away from the aircraft as it travels along its trajectory.

Returning to FIG. 6, at block 630 the system detects whether any of the projected sonic boom rays are refracting. In some embodiments the system can detect refractions at an atmospheric layer, such as the thermosphere or stratosphere. In some embodiments the system can detect reflections off of the earth's surface (earth surface reflections are also referred to as "refractions" herein). In some embodiments the system continues to propagate projected sonic boom rays after they have been refracted (e.g., the rays continue to increment each time interval via the loop of blocks 615-625), with the propagation path of the projected sonic boom ray accounting for the change in direction caused by the ray refraction. In other words, a projected sonic boom ray refracting at an atmospheric layer can then propagate toward the earth surface, and a projected sonic boom ray reflecting off the earth surface can then propagate upward in the atmosphere. As described herein, the system can propagate refracted projected sonic boom rays to detect different types of secondary booms.

At block 635, the system determines the type of atmospheric refraction associated with any projected sonic boom rays that are detected to refract (e.g., detected at block 630). In some embodiments the system determines whether a projected sonic boom ray refracts at the stratosphere or at the thermosphere. For example, in some embodiments the system evaluates the altitude above the aircraft at which the refraction occurs to determine the type of atmospheric refraction. For example, the system can classify an atmospheric refraction at an altitude of approximately 4-12 miles as being associated with a stratosphere refraction, and can classify an atmospheric refraction at an altitude of approximately 50 miles as being associated with a thermosphere refraction. In some embodiments, the system calculates the paths of rays caused by the refraction at certain atmospheric layers (e.g., the stratosphere), but does not calculate the paths of rays caused by the refraction at other atmospheric layers (e.g., the thermosphere). For example, in some embodiments the system will cease to propagate a projected sonic boom ray toward the earth surface (e.g., perform loop of blocks 615-625) once the projected sonic boom ray refracts at the thermosphere.

At block 640, the system generates sonic boom wavefronts based on the projected sonic boom rays and the absolute times associated with the rays along their propagation paths. For example, the system can identify nearby (e.g., in three-dimensional space) projected sonic boom rays with the same absolute time, which define the points along a wavefront associated with that absolute time.

At block 645, the system detects whether any of the projected sonic boom rays that form a generated wavefront have intercepted the earth surface. In some embodiments the detection is based on surface geospatial data (e.g., obtained in process 500). Based on the absolute time associated with each projected sonic boom ray as they propagate at each interval, the system can also determine the absolute time at which the projected sonic boom rays intercept the earth surface. As described herein, the system can use the determined earth surface intercept locations and times to generate standoff distances (e.g., the process 800 illustrated in FIG. 8), as well as determine whether the aircraft may violate any sonic boom prohibitions and/or whether to generate a sonic boom warning (e.g., blocks 525 and 530 of process 500 illustrated in FIG. 5).

It will be appreciated that the time synchronization steps performed by the real time sonic boom warning system (e.g., the process 600) can advantageously facilitate a more physically relevant depiction of how the sonic boom carpets exist at the ground. Under conventional ray tracing methodologies, including those utilized in some embodiments of the real time sonic boom warning system, a system of rays is typically launched at various azimuth angles and instances in time along the aircraft trajectory. These rays will reach the ground at different instances in time due to a variety of factors, including the azimuthal angles they originate from, and the impact of atmospheric wind and temperature gradients that bend the propagation path, etc. This approach can be somewhat misleading in how sonic boom carpets are depicted, including the time-space correlation of projected sonic boom strikes at the earth's surface. In contrast, the time synchronization process, additionally performed in some embodiments of the real time sonic boom warning system, performs chronological bookkeeping to create wavefronts and to reconcile which rays arrive at the ground at common instances in time. These rays that share a synchronized intercept time at the surface are used by the system to, for example, display information to a pilot or other user (including sonic information), to generate a sonic boom warning, etc. The common intercept times can be synchronized, in some embodiments, for the primary and secondary sonic booms.

An isolabe is a predicted intercept line for a sonic boom carpet where the continuum of points along the line all exist at a common instance in time. An isopemp is a predicted intercept line at the surface for the sonic boom carpet but the points were generated at a common instance in time. Hence, for an isopemp, the points may be drawn on the surface as a continuous line, but they do not depict the physical nature of how the sonic boom carpet exists at the ground. This is because the propagation path is not the same for all azimuths and as a result, they will reach the ground at different points in time. The earth surface intercept of the sonic boom wavefront, in reality, results in an isolabe where the continuous line of points all exist at a common arrival time. Thus, the isolabe presentation is more representative of how the sonic boom carpet intercepts physically exist at the surface.

Figure 7B:
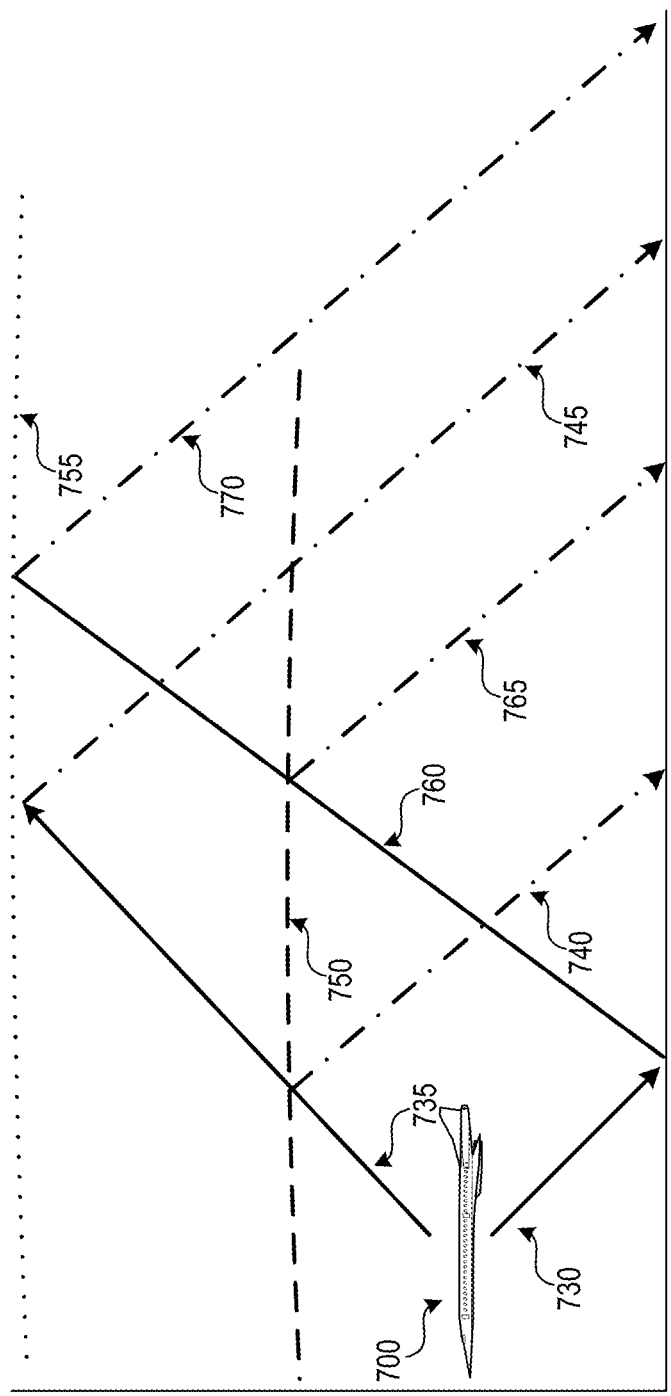
FIG. 7B illustrates a representative commercial supersonic aircraft with calculated sonic boom wavefronts, in accordance with representative embodiments of the present technology.

FIG. 7B illustrates a representative commercial supersonic aircraft 700 with calculated sonic boom wavefronts, to illustrate the sonic boom wavefronts that result from ray path calculations performed by process 600 in accordance with representative embodiments of the present technology. Sonic boom wavefronts 730 and 735 are constructed from one or more sonic boom rays (not shown) projected from the underside and upper surface(s), respectively, of the commercial supersonic aircraft 700. The system can also construct the wavefronts 740 and 745 constructed from sonic boom rays propagated from different instances in the aircraft trajectory. For example, the system can calculate a wavefront 740 corresponding to a refraction of sonic boom rays at the stratosphere 750. Additionally, the system can calculate a wavefront 745 corresponding to a refraction at the thermosphere 755. Furthermore, the system can calculate a reflection 760 of wavefront 730 off of the ground, resulting in wavefronts 765 and 770. As described herein, each of the wavefronts 730, 735, 740, 760, and 765 can be constructed from synchronized sonic boom rays. As described herein, the system can further evaluate where each of the wavefronts 730, 740 and 765 intercept the surface and therefore are likely to generate a surface-level sonic boom. Additionally, these calculations can be made at discrete azimuths circumferentially around the aircraft to capture the full sonic boom wavefront cone emanating from the aircraft.

Figure 7C:
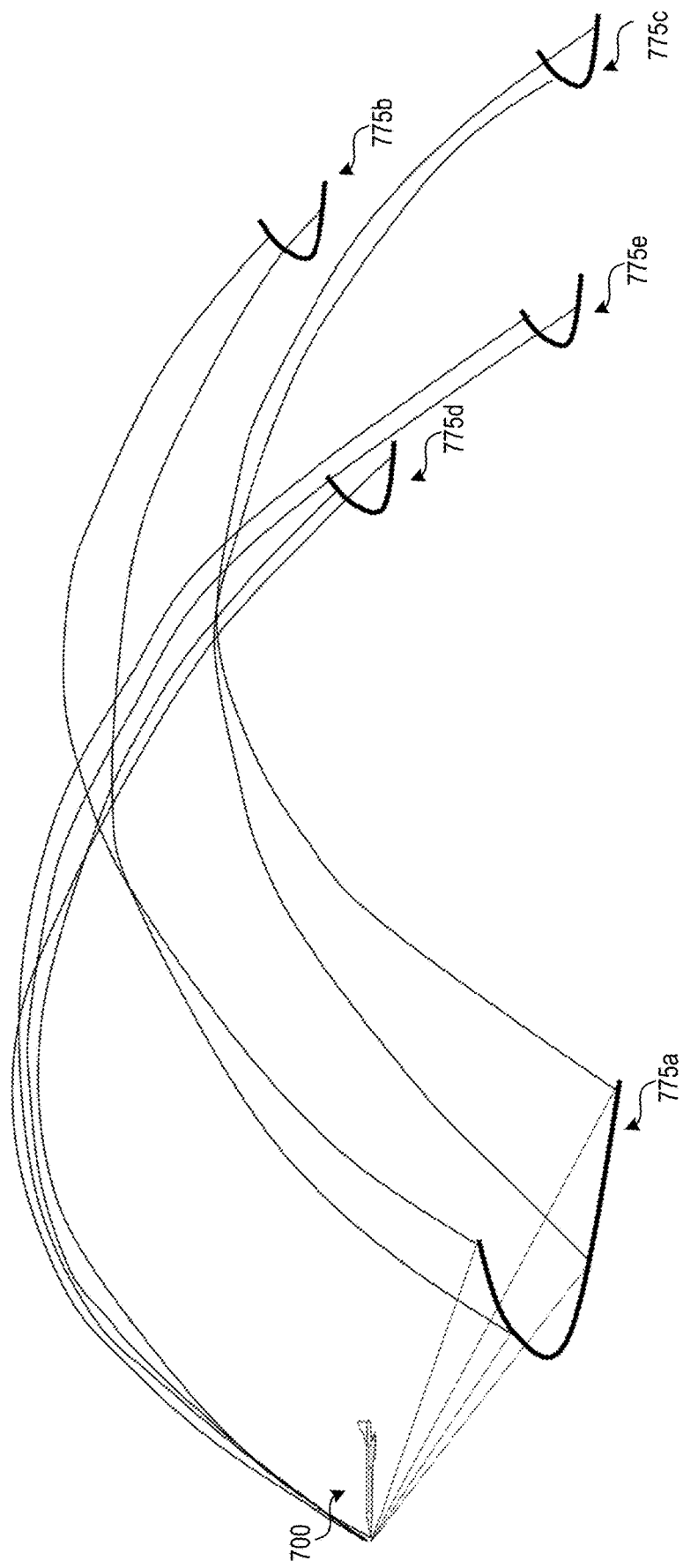
FIG. 7C illustrates a representative commercial supersonic aircraft with earth surface intercepts based on calculated sonic boom wavefronts, in accordance with representative embodiments of the present technology.

FIG. 7C schematically illustrates a representative commercial supersonic aircraft 700 with earth surface intercepts 775a, 775b, 775c, 775d, and 775e based on calculated sonic boom wavefronts, in accordance with representative embodiments of the present technology. For example, the system can generate a first earth surface intercept 775a based on the common absolute time earth surface intercept of projected sonic boom rays. Furthermore, the system can generate second and third earth surface intercepts 775b and 775c from projected sonic boom rays that refract after striking the surface of the earth. Similarly, the system can generate fourth and fifth earth surface intercepts 775d and 775e from projected sonic boom rays that refract off an atmospheric layer before striking the earth surface.

Figure 8:
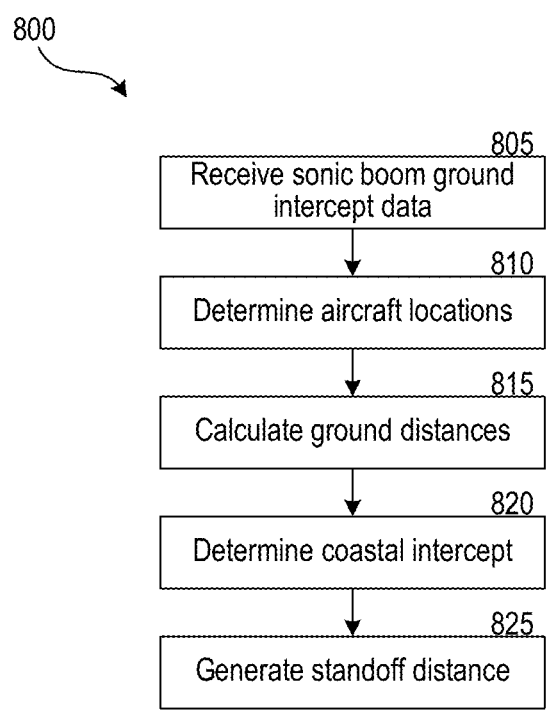
FIG. 8 is a flowchart of a process implemented by a real time sonic boom warning system for determining standoff distances, in accordance with representative embodiments of the present technology.

FIG. 8 is a flowchart of a process 800, implemented by a real time sonic boom warning system, for determining standoff distances, in accordance with representative embodiments of the present technology. The process 800 can be performed, for example, as part of a process for warning supersonic aircraft pilots and other users of sonic booms (e.g., as represented by block 525 of the process 500 illustrated in FIG. 5).

The process 800 begins at block 805, where the system receives data characterizing the ground intercept locations of primary and/or secondary sonic booms. For example, the received sonic boom ground intercept location data can be generated by the system (e.g., at block 520 of process 500 illustrated in FIG. 5, and/or by process 600 illustrated in FIG. 6). In some embodiments the received sonic boom ground intercept location data characterizes all sonic booms predicted to be generated along an aircraft's trajectory. In some embodiments the received sonic boom ground intercept location data characterizes sonic booms generated when the aircraft's trajectory is within a threshold distance of prohibited regions (e.g., populated areas and/or a coastline). For example, the received sonic boom ground intercept location data can characterize any sonic booms predicted to be generated when the aircraft is within 1,000 miles of a coastline and/or populated area.

At block 810, the system determines the aircraft location, along its trajectory, corresponding to each of the sonic boom ground intercept locations.

At block 815, the system calculates the ground distances traveled by sonic boom rays, from their respective emission locations along the aircraft trajectory, before reaching the ground. In some embodiments the system calculates forward distances of sonic boom rays and/or lateral distances from either side of the aircraft.

At block 820, the system determines coastal intercept locations based on the sonic boom ground intercept locations and the aircraft locations corresponding to those sonic boom ground intercepts. To determine coastal intercepts, in some embodiments the system projects a "spanning line" that extends from the aircraft location, to the sonic boom ground intercept location, and continues to the coast line. In other words, the determined coastal intercept characterizes the closest coastal location to the aircraft for a sonic boom ray launched at that particular azimuth.

Figure 9A:
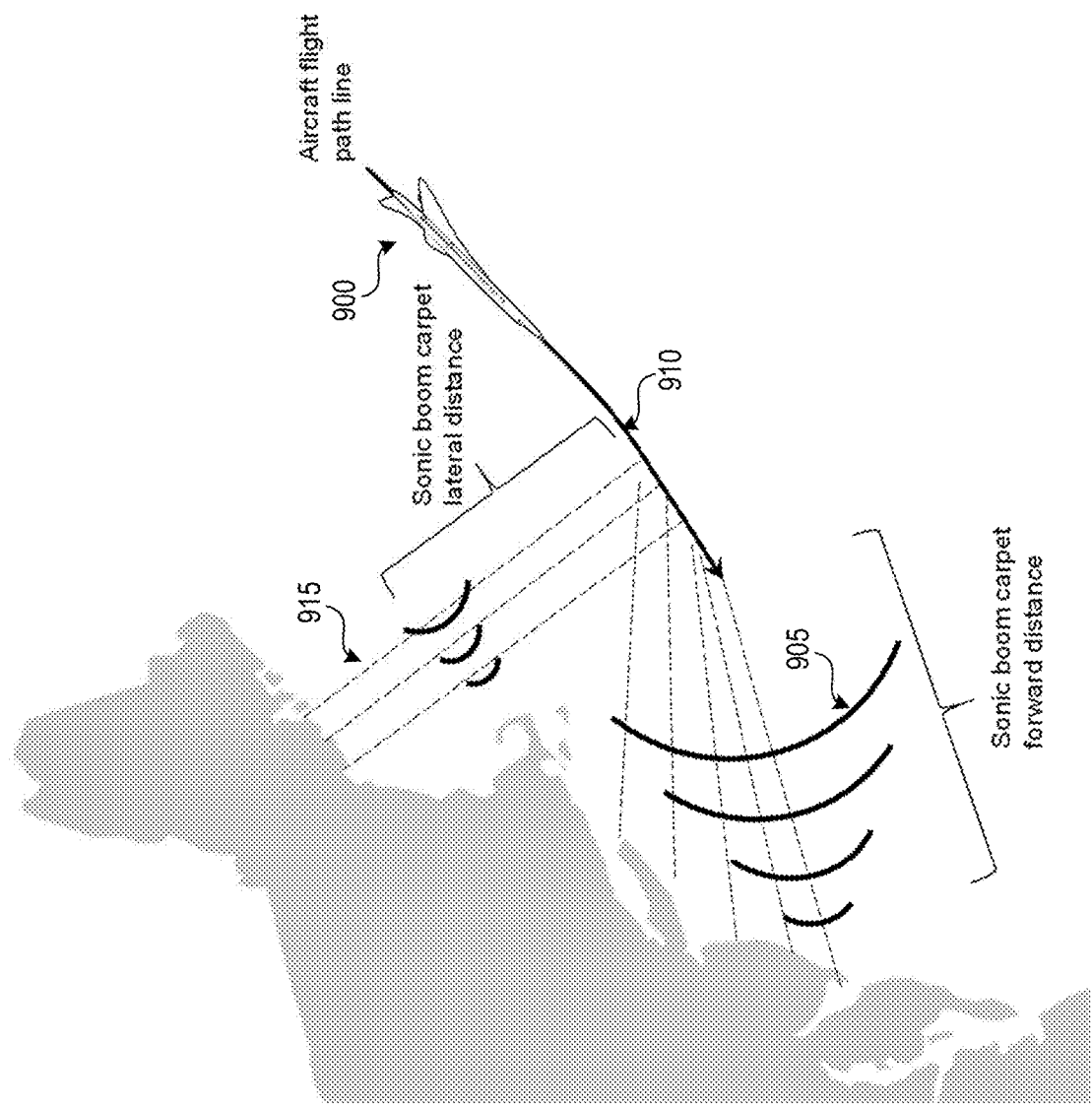
FIGS. 9A and 9B illustrate an example of coastal buffer distances and corresponding coastal buffer zone, in accordance with representative embodiments of the present technology.

FIG. 9A illustrates a representation of calculated ground distances and coastal intercepts (e.g., by block 815 and block 820, respectively, of process 800 illustrated in FIG. 8) of aircraft 900. As illustrated in the figure, the aircraft 900 is predicted to cause one or more sonic boom ground intercepts, illustrated as isolabe 905, as the aircraft 900 travels along its trajectory 910. The spanning line 915, extending from the aircraft 900 location along its trajectory 910, past the isolabe 905, continues until it reaches the coast line. The location where the spanning line reaches the coast line, or the coastal intercept, identifies the closest coastal location to the aircraft for a sonic boom ray launched at that particular azimuth.

Returning to FIG. 8, at block 825 the system generates a standoff distance. In some embodiments, to generate the standoff distance the system based on a combination of the coastal intercept (determined at block 820) and ground distance (determined at block 815). For example, starting from the location of the coastal intercept, the system can determine the location along the corresponding spanning line, moving toward the aircraft, with a distance from the coast equivalent to the ground distance. In other words, the system projects the "ground distance" length along the spanning line from the coast towards the aircraft.

The process 800 is completed for multiple emission azimuth angles, points along the aircraft trajectory, and associated prohibited regions. Since the distance between the aircraft location projected to the ground and the ground intercepts of the sonic boom rays is dependent on the associated emission azimuth angle of the sonic boom ray, this leads to the coastal buffer distance dependent on the relative orientation between the aircraft flight trajectory and the coastline.

Additionally, in some embodiments the system may evaluate multiple possible ray paths launched from different azimuths that reach the same coastal location, but at different arrival times. The system can assign a coastal buffer distance for that coastal location that corresponds to the largest associated ground distance computed for each of the azimuths launched that arrive at that particular coastal location.

Figure 9B:
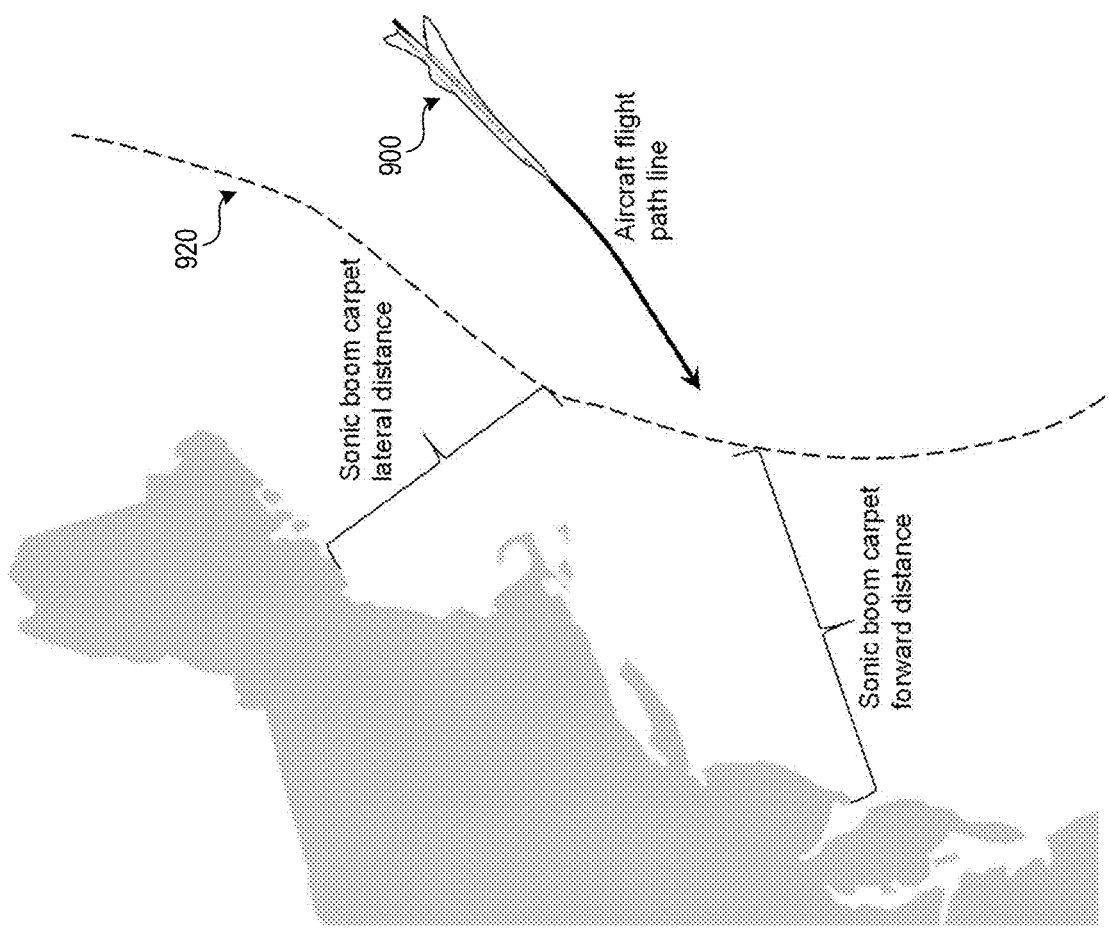

FIG. 9B illustrates a representation of calculated standoff distances 920 (e.g., by process 800) for aircraft 900. As illustrated in FIG. 9B, the standoff distances 920 follow the boundary of a prohibited region (e.g., the coastline), and account for the lateral and forward distance of sonic booms. In other words, the system determines standoff distances such that sonic booms, generated by an aircraft at least that distance from a prohibited region, do not strike the prohibited region.

Figure 10A:
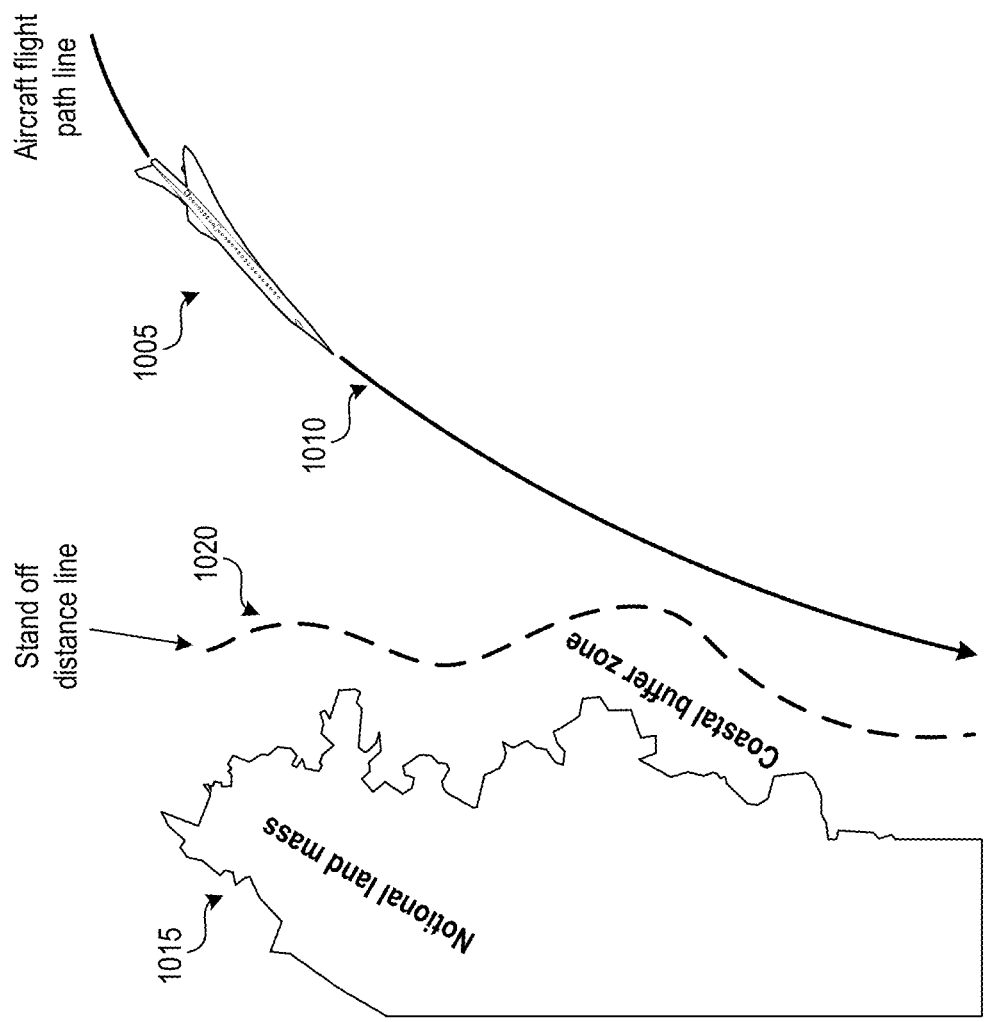
FIGS. 10A and 10B illustrate cockpit displays of a representative commercial supersonic aircraft, displaying data from a real time sonic boom warning system, in accordance with representative embodiments of the present technology.

FIG. 10A illustrates a map (e.g., a map 1000) displayed by the system, in accordance with representative embodiments of the present technology. The map 1000 can be generated, for example, by the block 530 (FIG. 5), and can be displayed on an onboard display of a commercial supersonic aircraft (e.g., part of the flight deck 160) or at a computing system at a ground-based controller. The map 1000 includes a representation of the supersonic aircraft 1005 and the supersonic aircraft's flight path line 1010. The map 1000 can also include representations of prohibited regions, including landmass 1015. The map 1000 can additionally include a standoff distance line 1020, which represents the system's determined distance that the supersonic aircraft 1005 needs to maintain between it and the landmass 1015 to prevent any sonic booms from striking the landmass. The system can determine the standoff distance, for example, using the process 800. In the illustration of FIG. 10A, the region between the landmass 1015 and the standoff distance line 1020 is labeled as a coastal buffer zone.

Figure 10B:
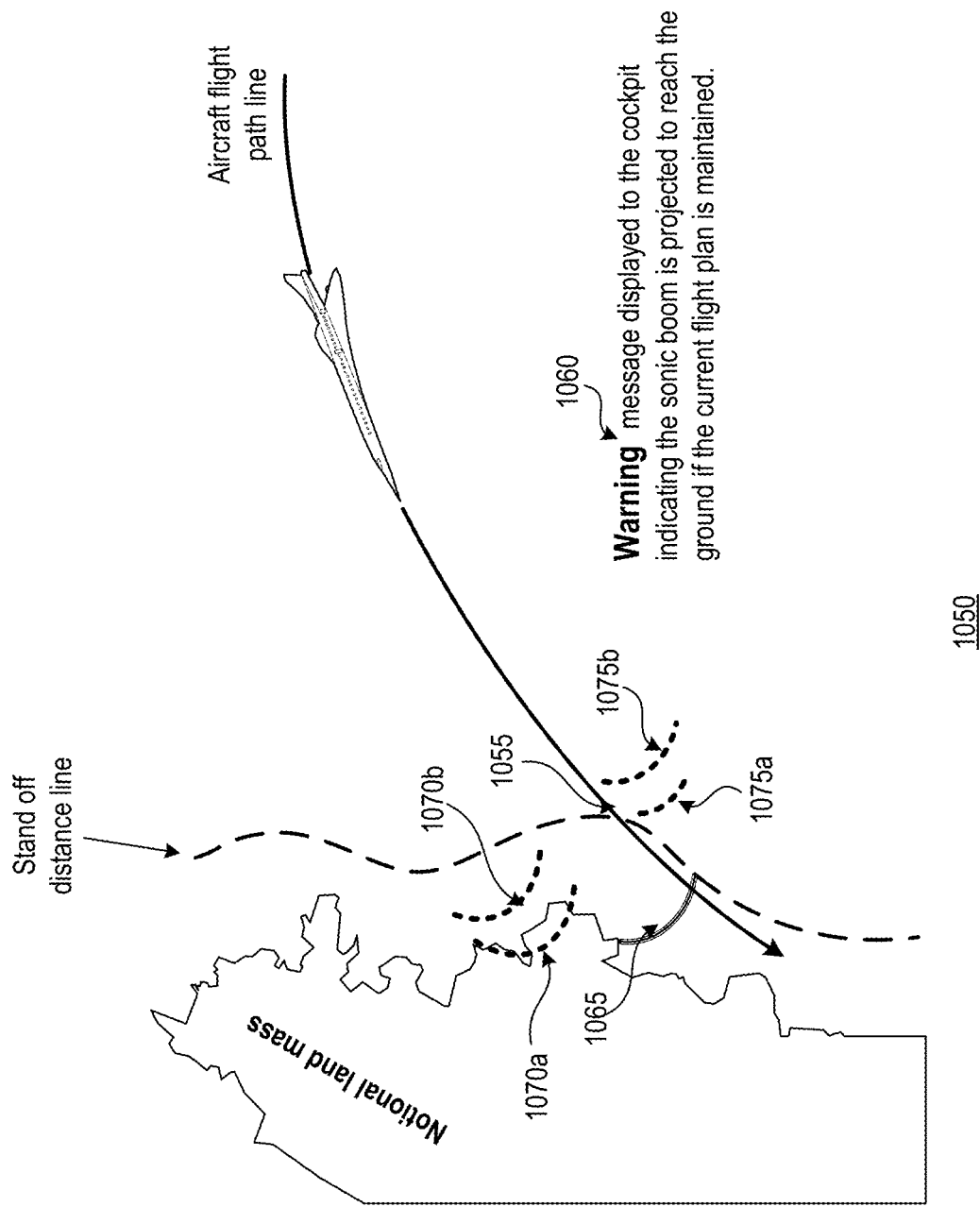

FIG. 10B illustrates an additional example map 1050 displayed by the system, in accordance with representative embodiments of the present technology. The map 1050 illustrated in FIG. 10B includes the same information of the map 1000 illustrated in FIG. 10A, with additional indications due to predicted sonic boom violations. As illustrated in FIG. 10B, the aircraft's flight path line is projected to intersect the standoff distance line at an avoidance location 1055. As described herein, the avoidance location 1055 represents an area that the supersonic aircraft should maneuver to avoid, for example by adjusting its trajectory, such that the aircraft prevents generating sonic booms that violate prohibited regions. To help call the pilot's attention to the avoidance location 1055, the map 1050 can include a warning message 1060. The warning message 1060 can be, for example, a message displayed in the cockpit warning the pilot that a sonic boom is projected to reach a prohibited region (e.g., a landmass) if the current flight plan is maintained, and/or an auditory alarm, or other indication. The map 1050 can also include location information of the projected sonic boom intercepts, such as primary sonic boom intercept 1065, and direct and indirect secondary sonic boom intercepts 1070a, 1070b, 1075a, and 1075b. In the illustration of FIG. 10B, the primary and secondary sonic boom intercepts are displayed as isolabes.

CONCLUSION

Embodiments of the disclosed technology determine, in real time, when a supersonic aircraft is likely to generate a sonic boom that encroaches on a regulated region, and notify a pilot or other operator of the supersonic aircraft accordingly. In contrast to prior systems, which merely illustrate predicted sonic boom carpets, the disclosed technology determines a standoff distance, warns pilots of predicted sonic boom violations and/or infringements of coastal buffer distances, and directly notifies them of locations where they should avoid operations—with enough lead time that the pilot can change course (and/or take other actions) to avoid generating a sonic boom in a region where sonic booms are prohibited. The disclosed technology can therefore be advantageously used with commercial supersonic aircraft that are prohibited from causing sonic booms that disturb designated areas (e.g., over land or population centers). The disclosed technology can also generate more meaningful predictions of secondary boom strikes by evaluating atmospheric models and other statistical data for upper-air conditions well above the aircraft altitude. The disclosed technology can also provide an economic benefit, in that it can more readily determine the standoff distance instead of relying on overly conservative estimates. These overly conservative estimates for coastal buffer distances could unnecessarily reduce the supersonic flight segment of the aircraft mission and reduce its overall economic efficiency. The disclosed technology can therefore optimize (or at least improve) the supersonic flight segment, reducing travel time and/or improving the economic benefit of the aircraft's operations. Additionally, pilot workload can be reduced since pilots would not have to refer to any pilot manuals or make calculations on their own to determine the necessary coastal buffer distances. The disclosed technology removes this task from the pilot responsibilities.

Unless the context clearly requires otherwise, throughout the description and the examples, the words "comprise," "comprising," and the like are to be construed in an inclusive sense, as opposed to an exclusive or exhaustive sense; that is to say, in the sense of "including, but not limited to." As used herein, the terms "connected," "coupled," and/or any variant thereof, means any connection or coupling, either direct or indirect, between two or more elements; the coupling and/or connection between the elements can be physical, logical, and/or a combination thereof. Additionally, the words "herein," "above," "below," and words of similar import, when used in this application, shall refer to this application as a whole and not to any particular portions of this application. Furthermore, the word "or" is to be construed as "and/or" unless the context clearly requires otherwise. Where the context permits, words in the above Detailed Description using the singular or plural number may also include the plural or singular number respectively.

The above detailed description of implementations of the system is not intended to be exhaustive or to limit the system to the precise form disclosed above. While specific implementations of, and examples for, the system are described above for illustrative purposes, various equivalent modifications are possible within the scope of the system, as those skilled in the relevant art will recognize. For example, some network elements are described herein as performing certain functions. Those functions could be performed by other elements in the same or differing networks, which could reduce the number of network elements. Alternatively, or additionally, network elements performing those functions could be replaced by two or more elements to perform portions of those functions. In addition, while processes, message/data flows, and/or blocks are presented in a given order, alternative implementations may perform routines having blocks, or employ systems having blocks, in a different order, and some processes or blocks may be deleted, moved, added, subdivided, combined, and/or modified to provide alternative combinations or subcombinations. Each of these processes, message/data flows, and/or blocks may be implemented in a variety of different ways. Also, while processes and/or blocks are at times shown as being performed in series, these processes or blocks may instead be performed in parallel, and/or may be performed at different times. Further, any specific numbers noted herein are only examples: alternative implementations may employ differing values and/or ranges. Those skilled in the art will also appreciate that the actual implementation of a database may take a variety of forms, and the term "database" is used herein in the generic sense to refer to any data structure that allows data to be stored and accessed, such as tables, linked lists, arrays, etc.

The teachings of the methods and systems provided herein can be applied to other systems, not necessarily the system described above. The elements, blocks, and acts of the various implementations described above can be combined to provide further implementations.

Any patents and applications and other references noted above, including any that may be listed in accompanying filing papers, are incorporated herein by reference. To the extent any materials incorporated herein by reference conflict with the present disclosure, the present disclosure controls. Aspects of the technology can be modified, if necessary, to employ the systems, functions, and concepts of the various references described above to provide yet further implementations of the technology.

From the foregoing, it will be appreciated that specific embodiments of the disclosed technology have been described herein for purposes of illustration, but that various modifications may be made without deviating from the technology. For example, the disclosed technology may be used to predict in real time the sonic booms created by an autonomous supersonic aircraft. In embodiments in which the disclosed technology is applied to an autonomous supersonic aircraft, the system may provide information (e.g., the predicted sonic boom location and sonic boom warnings) to a flight computer instead of or in addition to a ground-based human operator. Certain aspects of the technology described in the context of particular embodiments may be combined or eliminated in other embodiments. Further, while advantages associated with certain embodiments of the disclosed technology have been described in the context of those embodiments, other embodiments may also exhibit such advantages, and not all embodiments need necessarily exhibit such advantages to fall within the scope of the technology. Accordingly, the disclosure and associated technology can encompass other embodiments not expressly shown or described herein.

I claim:

1. A method, performed by a computing system, to notify a supersonic aircraft operator of expected sonic boom strike locations, the method comprising:
   receiving, while a supersonic aircraft is in flight, a real-time flight trajectory of the supersonic aircraft;
   receiving, while the supersonic aircraft is in flight, atmospheric meteorological data corresponding to the real-time flight trajectory;
   receiving, while the supersonic aircraft is in flight, surface geospatial data corresponding to the real-time flight trajectory;
   calculating, while the supersonic aircraft is in flight, an expected location of a surface strike of a sonic boom, caused by the supersonic aircraft, based on the real-time flight trajectory, the atmospheric meteorological data, and the surface geospatial data,
      wherein the expected location of the surface strike of the sonic boom is calculated based on a plurality of selected sonic boom rays, selected from a plurality of projected sonic boom rays, wherein each of the plurality of projected sonic boom rays is associated with an emission time and a surface intercept time, wherein the selected sonic boom rays are selected based on having a common surface intercept time, wherein at least a first of the selected sonic boom rays is associated with an emission time different than an emission time associated with a second of the selected sonic boom rays, and wherein at least one of the plurality of projected sonic boom rays is not included in the plurality of selected sonic boom rays;
   calculating, while the supersonic aircraft is in flight and based on the location of the sonic boom surface strike, a standoff distance from a coastline or a populated region;
   evaluating, while the supersonic aircraft is in flight, whether the real-time flight trajectory of the supersonic aircraft violates the standoff distance; and
   if the real-time flight trajectory violates the standoff distance, providing a notification, while the supersonic aircraft is in flight, on a cockpit display of the supersonic aircraft, to the supersonic aircraft operator characterizing the standoff distance violation.

2. The method of claim 1, wherein the atmospheric meteorological data characterize at least one of a stratosphere or a thermosphere layer of an atmosphere.

3. The method of claim 1, wherein the surface geospatial data characterizes at least one of a coastline or a populated area, and wherein the calculation of the standoff distance is based further on the surface geospatial data.

4. The method of claim 1, further comprising:
   receiving updated real-time flight trajectory data based on the flight of the supersonic aircraft;
   calculating a location of a surface strike of a second sonic boom based on the updated real-time flight trajectory data;
   updating the calculated standoff distance based on the location of the second sonic boom surface strike; and
   evaluating whether the updated real-time flight trajectory of the supersonic aircraft violates the updated standoff distance.

5. The method of claim 1, wherein the cockpit display is part of a flight deck of the supersonic aircraft.

6. The method of claim 1, wherein at least three of the projected sonic boom rays based on which the expected location of the sonic boom surface strike is calculated have different emission times.

7. The method of claim 1, further comprising calculating a location of a surface strike of a second sonic boom, wherein the second sonic boom is a secondary sonic boom caused by the sonic boom.

8. The method of claim 1, wherein calculating the expected location of the surface strike comprises:
generating, at a plurality of locations along the real-time flight trajectory, the plurality of projected sonic boom rays, wherein the emission time of each of the plurality of projected sonic boom rays is based on the corresponding location along the real-time flight trajectory;
calculating, for a plurality of discrete time intervals, corresponding propagation paths of the projected sonic boom rays at each time interval;
determining an earth surface intercept location for each of the projected sonic boom rays based on the propagation path of the projected sonic boom ray and the surface geospatial data;
calculating, for each projected sonic boom ray, the surface intercept time based on the emission time of the projected sonic boom ray and the time interval associated with the earth surface intercept location of the projected sonic boom ray;
identifying projected sonic boom rays with a same surface intercept time and nearby earth surface intercept locations, wherein the plurality of selected projected sonic boom rays comprises the identified projected sonic boom rays; and
generating a sonic boom surface strike based on the earth surface intercept locations of the identified projected sonic boom rays.

9. The method of claim 8, wherein the plurality of projected sonic boom rays are associated with different originating azimuthal angles.

10. The method of claim 8, wherein the atmospheric meteorological data characterizes atmospheric wind and temperature gradients, and wherein the calculation of the projected sonic boom ray propagation paths is based on the atmospheric wind and temperature gradient characterizations in the atmospheric meteorological data.

11. The method of claim 1, wherein the computing system is on board the supersonic aircraft.

12. A non-transitory computer-readable medium having instructions configured to cause one or more processors to perform a method, the method comprising:
receiving, while a supersonic aircraft is in flight, a real-time flight trajectory of the supersonic aircraft;
receiving, while the supersonic aircraft is in flight, atmospheric meteorological data corresponding to the real-time flight trajectory;
receiving, while the supersonic aircraft is in flight, surface geospatial data corresponding to the real-time flight trajectory;
calculating, while the supersonic aircraft is in flight, an expected location of a surface strike of a sonic boom, caused by the supersonic aircraft, based on the real-time flight trajectory, the atmospheric meteorological data, and the surface geospatial data,
wherein the expected location of the surface strike of the sonic boom is calculated based on a plurality of selected sonic boom rays, selected from a plurality of projected sonic boom rays, wherein each of the plurality of projected sonic boom rays is associated with an emission time and a surface intercept time, wherein the selected sonic boom rays are selected based on having a common surface intercept time, and wherein at least a first of the selected sonic boom rays is associated with an emission time different than an emission time associated with a second of the selected sonic boom rays, and wherein at least one of the plurality of projected sonic boom rays is not included in the plurality of selected sonic boom rays;
calculating, while the supersonic aircraft is in flight and based on the location of the sonic boom surface strike, a standoff distance from a coastline or a populated region;
evaluating, while the supersonic aircraft is in flight, whether the real-time flight trajectory of the supersonic aircraft violates the standoff distance; and
if the real-time flight trajectory violates the standoff distance, providing a notification, while the supersonic aircraft is in flight, on a cockpit display of the supersonic aircraft, to a supersonic aircraft operator characterizing the standoff distance violation.

13. The non-transitory computer-readable medium of claim 12, the method further comprising:
receiving updated real-time flight trajectory data based on the flight of the supersonic aircraft;
calculating a location of a surface strike of a second sonic boom based on the updated real-time flight trajectory data;
updating the calculated standoff distance based on the location of the second sonic boom surface strike; and
evaluating whether the updated real-time flight trajectory of the supersonic aircraft violates the updated standoff distance.

14. The non-transitory computer-readable medium of claim 12, wherein at least three of the projected sonic boom rays based on which the expected location of the sonic boom surface strike is calculated have different emission times.

15. The non-transitory computer-readable medium of claim 12, wherein the cockpit display is part of a flight deck of the supersonic aircraft.

16. The non-transitory computer-readable medium of claim 12, wherein calculating the expected location of the surface strike comprises:
generating, at a plurality of locations along the real-time flight trajectory, the plurality of projected sonic boom rays, wherein the emission time of each of the plurality of projected sonic boom rays is based on the corresponding location along the real-time flight trajectory;
calculating, for a plurality of discrete time intervals, corresponding propagation paths of the projected sonic boom rays at each time interval;
determining an earth surface intercept location for each of the projected sonic boom rays based on the propagation path of the projected sonic boom ray and the surface geospatial data;
calculating, for each projected sonic boom ray, the surface intercept time based on the emission time of the projected sonic boom ray and the time interval associated with the earth surface intercept location of the projected sonic boom ray;
identifying projected sonic boom rays with a same surface intercept time and nearby earth surface intercept locations, wherein the plurality of selected projected sonic boom rays comprises the identified projected sonic boom rays; and generating a sonic boom surface strike based on the earth surface intercept locations of the identified projected sonic boom rays.

17. A commercial supersonic aircraft, comprising:
a computing controller having instructions that, when executed:
  receive a flight trajectory of a supersonic aircraft;
  receive atmospheric meteorological data corresponding to the flight trajectory;
  receive surface geospatial data corresponding to the flight trajectory;
  calculate an expected location of a surface strike of a sonic boom, caused by the supersonic aircraft, based on the flight trajectory, the atmospheric meteorological data, and the surface geospatial data,
    wherein the expected location of the surface strike of the sonic boom is calculated based on a plurality of selected sonic boom rays, selected from a plurality of projected sonic boom rays, wherein each of the plurality of projected sonic boom rays is associated with an emission time and a surface intercept time, wherein the selected sonic boom rays are selected based on having a common surface intercept time, wherein at least a first of the selected sonic boom rays is associated with an emission time different than an emission time associated with a second of the selected sonic boom rays, and wherein at least one of the plurality of projected sonic boom rays is not included in the plurality of selected sonic boom rays;
  calculate, based on the location of the sonic boom surface strike, a standoff distance from a coastline or a populated region;
  evaluate whether the flight trajectory of the supersonic aircraft violates the standoff distance; and
  if the flight trajectory violates the standoff distance, provide a notification, on a cockpit display of the supersonic aircraft, to a supersonic aircraft operator characterizing the standoff distance violation.

18. The commercial supersonic aircraft of claim 17, wherein the surface geospatial data characterizes at least one of a coastline or a populated area, and wherein the calculation of the standoff distance is based further on the surface geospatial data.

19. The commercial supersonic aircraft of claim 17, further comprising a flight deck, the flight deck having the cockpit display.

20. The commercial supersonic aircraft of claim 17, wherein at least three of the projected sonic boom rays based on which the expected location of the sonic boom surface strike is calculated have different emission times.

* * * * *